(12) United States Patent
Miyashita

(10) Patent No.: US 10,583,856 B2
(45) Date of Patent: Mar. 10, 2020

(54) STEER-BY-WIRE SYSTEM, AND CONTROL METHOD FOR STEER-BY-WIRE SYSTEM

(71) Applicant: Nissan Motor Co., Ltd., Yokohama-shi, Kanagawa (JP)

(72) Inventor: Yuki Miyashita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 277 days.

(21) Appl. No.: 15/745,775

(22) PCT Filed: Jul. 31, 2015

(86) PCT No.: PCT/JP2015/071764
§ 371 (c)(1),
(2) Date: Jan. 18, 2018

(87) PCT Pub. No.: WO2017/022006
PCT Pub. Date: Feb. 9, 2017

(65) Prior Publication Data
US 2018/0208235 A1   Jul. 26, 2018

(51) Int. Cl.
*B62D 5/00* (2006.01)
*B62D 5/04* (2006.01)
(Continued)

(52) U.S. Cl.
CPC .............. *B62D 5/046* (2013.01); *B62D 5/001* (2013.01); *B62D 5/003* (2013.01); *B62D 5/0481* (2013.01); *B62D 6/00* (2013.01); *B62D 6/08* (2013.01)

(58) Field of Classification Search
USPC .................................................. 701/36, 41–46
See application file for complete search history.

(56) References Cited

U.S. PATENT DOCUMENTS 4,865,144 A * 9/1989 North ................... B62D 5/003
180/402
5,471,205 A * 11/1995 Izawa .................. G01C 21/367
340/988

(Continued)

FOREIGN PATENT DOCUMENTS

JP     2003-343333 A    12/2003
JP     2008-105522 A     5/2008
(Continued)

*Primary Examiner* — Jonathan L Sample
(74) *Attorney, Agent, or Firm* — Global IP Counselors, LLP

(57) ABSTRACT

A steer-by-wire control method is provided for a steer-by-wire system mounted in a vehicle that is equipped with an engine and a battery. The steer-by-wire control method stores a deviation angle between a steering angle and a turning angle in a non-volatile memory of the steer-by-wire system as a readable value when an ignition switch is switched from ON to OFF. The steer-by-wire control method further reads the deviation angle from the non-volatile memory when the ignition switch is switched from OFF to ON. The steer-by-wire control method further prohibits further reading of the deviation angle from the non-volatile memory after reading the deviation angle from the non-volatile memory and after reading the deviation angle from the non-volatile memory and after starting the steer-by-wire control.

7 Claims, 11 Drawing Sheets

(51) Int. Cl.
   *B62D 6/00*     (2006.01)
   *B62D 6/08*     (2006.01)

(56) References Cited

U.S. PATENT DOCUMENTS

| | | | | |
|---|---|---|---|---|
| 6,013,994 A * | 1/2000 | Endo | B62D 5/0463 | 318/430 |
| 6,076,627 A * | 6/2000 | Bohner | B62D 5/06 | 180/403 |
| 6,082,482 A * | 7/2000 | Kato | B62D 6/008 | 180/402 |
| 6,219,604 B1 * | 4/2001 | Dilger | B62D 6/003 | 180/422 |
| 6,594,568 B2 * | 7/2003 | Matsuoka | B62D 5/046 | 180/446 |
| 6,625,530 B1 * | 9/2003 | Bolourchi | B62D 6/008 | 180/402 |
| 6,640,923 B1 * | 11/2003 | Dominke | B62D 5/008 | 180/443 |
| 6,650,979 B1 * | 11/2003 | Kreft | B60T 8/326 | 303/140 |
| 6,697,722 B2 * | 2/2004 | Fujimori | B62D 5/0469 | 180/443 |
| 6,755,276 B2 * | 6/2004 | Clephas | B62D 5/003 | 180/402 |
| 6,763,907 B2 * | 7/2004 | Ueno | B62D 5/008 | 180/444 |
| 7,186,155 B2 * | 3/2007 | Nickerson | B63H 25/14 | 440/1 |
| 7,366,602 B2 * | 4/2008 | Xu | B60R 21/0132 | 280/6.15 |
| 7,386,379 B2 * | 6/2008 | Naik | B60K 17/356 | 180/6.5 |
| 7,739,001 B2 * | 6/2010 | Kato | B62D 5/008 | 180/412 |
| 7,826,950 B2 * | 11/2010 | Tamaizumi | B62D 5/0463 | 180/443 |
| 7,908,056 B2 * | 3/2011 | Hwang | B62D 6/008 | 701/41 |
| 8,666,601 B1 * | 3/2014 | Van Wiemeersch | B62D 15/0285 | 701/41 |
| 9,573,617 B2 * | 2/2017 | Shibuya | B60W 10/02 | |
| 2001/0011201 A1 * | 8/2001 | Nishizaki | B62D 5/006 | 701/41 |
| 2001/0027364 A1 * | 10/2001 | Matsuoka | B62D 5/046 | 701/41 |
| 2003/0028306 A1 * | 2/2003 | Fujimori | B62D 6/002 | 701/41 |
| 2003/0201136 A1 * | 10/2003 | Ueno | B62D 5/008 | 180/443 |
| 2003/0213641 A1 * | 11/2003 | Nakano | B62D 5/008 | 180/446 |
| 2004/0094351 A1 * | 5/2004 | Higashi | B62D 15/0245 | 180/402 |
| 2004/0128042 A1 * | 7/2004 | Takahashi | B62D 5/003 | 701/41 |
| 2004/0182626 A1 * | 9/2004 | Katou | G01L 5/221 | 180/226 |
| 2005/0038585 A1 * | 2/2005 | Asaumi | B62D 5/0463 | 701/43 |
| 2005/0072621 A1 * | 4/2005 | Hara | B62D 1/163 | 180/444 |
| 2005/0102083 A1 * | 5/2005 | Xu | B60R 21/0132 | 701/70 |
| 2005/0189161 A1 * | 9/2005 | Zheng | B62D 6/003 | 180/402 |
| 2005/0209752 A1 * | 9/2005 | Ono | B62D 5/008 | 701/41 |
| 2005/0252433 A1 * | 11/2005 | Gai | B63H 25/02 | 114/144 R |
| 2006/0200289 A1 * | 9/2006 | Chino | B62D 5/003 | 701/41 |
| 2006/0271260 A1 * | 11/2006 | Matsuzaki | B60W 10/06 | 701/48 |
| 2006/0278152 A1 * | 12/2006 | Nickerson | B63H 25/14 | 114/144 R |
| 2006/0289227 A1 * | 12/2006 | Chino | B62D 1/163 | 180/402 |
| 2007/0137921 A1 * | 6/2007 | Kasahara | B62D 5/003 | 180/405 |
| 2007/0170667 A1 * | 7/2007 | Xu | B60R 21/0132 | 280/5.507 |
| 2007/0213901 A1 * | 9/2007 | Shin | B62D 6/007 | 701/41 |
| 2007/0256884 A1 * | 11/2007 | Wilhelm Rekow | B62D 5/09 | 180/403 |
| 2008/0086251 A1 * | 4/2008 | Lu | B60T 8/1755 | 701/70 |
| 2009/0024281 A1 * | 1/2009 | Hwang | B62D 5/006 | 701/42 |
| 2009/0260913 A1 * | 10/2009 | Ito | B62D 5/001 | 180/444 |
| 2010/0114431 A1 * | 5/2010 | Switkes | B60T 8/17557 | 701/41 |
| 2014/0066254 A1 * | 3/2014 | Murakami | B60W 10/20 | 477/167 |
| 2015/0175199 A1 * | 6/2015 | Kuramochi | B62D 6/10 | 701/41 |
| 2015/0203147 A1 * | 7/2015 | Kuramochi | B62D 5/001 | 701/41 |
| 2015/0291210 A1 * | 10/2015 | Kageyama | B60W 10/188 | 701/41 |

FOREIGN PATENT DOCUMENTS

JP    2014-223862 A     12/2014
WO    2014/108967 A1    7/2014

\* cited by examiner

| | Diagnostic Results | | | | | | | | |
|---|---|---|---|---|---|---|---|---|---|
| 1ST TURNING MOTOR CONTROL UNIT | O | O | X | O | O | O | X | X | X |
| 2ND CONTROL MOTOR CONTROL UNIT | O | O | O | X | O | X | O | X | X |
| REACTION FORCE MOTOR CONTROL UNIT | O | O | O | O | X | X | O | X | X |
| TURNING ANGLE READOUT | O | X | O | | O | | | — | |
| TRAVELING MODE | 2M-SBW | Tmp-EPS (2M-EPS) | 1M-SBW | 1M-EPS | 1M-EPS | | | MS | |

FIG. 5

STEER-BY-WIRE SYSTEM, AND CONTROL METHOD FOR STEER-BY-WIRE SYSTEM

CROSS-REFERENCE TO RELATED APPLICATIONS

This application is a U.S. National stage application of International Application No. PCT/JP2015/071764, filed Jul. 31, 2015.

BACKGROUND

Field of the Invention

The present invention relates to a steer-by-wire system for turning wheels in a state in which a torque transmission path between the steering wheel and the turning wheels is mechanically separated, and a control method for the steer-by-wire system.

Background Information

Conventionally, the technique disclosed in Japanese Laid-Open Patent Application No. 2014-223862 (hereinafter referred to as Patent Document 1) is known as a steer-by-wire system. In this publication, steer-by-wire control is started when the ignition switch is switched to the on state and the battery voltage becomes a predetermined value or more.

SUMMARY

In the technique disclosed in Patent Document 1, steer-by-wire control is initiated when the battery voltage becomes a predetermined value or more. However, after the ignition switch is switched to the on state, due to the starting of the engine, the battery voltage varies. Therefore, there are cases in which it is necessary to initiate steer-by-wire control in a state in which the engine is not operating in a state of complete combustion, and thus there is the risk that sufficient electric power cannot be supplied to the steer-by-wire system, and the steer-by-wire system cannot be operated in a state in which the battery voltage is stable.

The object of the present invention is to provide a steer-by-wire system and a control method for the steer-by-wire system whereby the steer-by-wire system can be stably operated when the ignition switch is switched to the on state.

In order to achieve the above-described object, in the present invention, if it is detected that when the ignition switch is ON, the battery voltage is a predetermined value or more and the engine rotation speed is a first predetermined value or more, and the engine rotation speed during a predetermined period thereafter is the first predetermined value or less but is equal to or greater than a second predetermined value, the steering information stored in a memory of the steer-by-wire system is rendered invalid.

Therefore, it is possible to provide a steer-by-wire system whereby the steer-by-wire system can be operated in a state in which the battery voltage is stable.

BRIEF DESCRIPTION OF THE DRAWINGS

Referring now to the drawings, several embodiments of a vehicle equipped with a steer-by-wire system is illustrated.

FIG. 5 is a table used by a traveling mode setting unit according to the first embodiment to set a traveling mode.

DETAILED DESCRIPTION OF THE EMBODIMENTS

Figure 1:
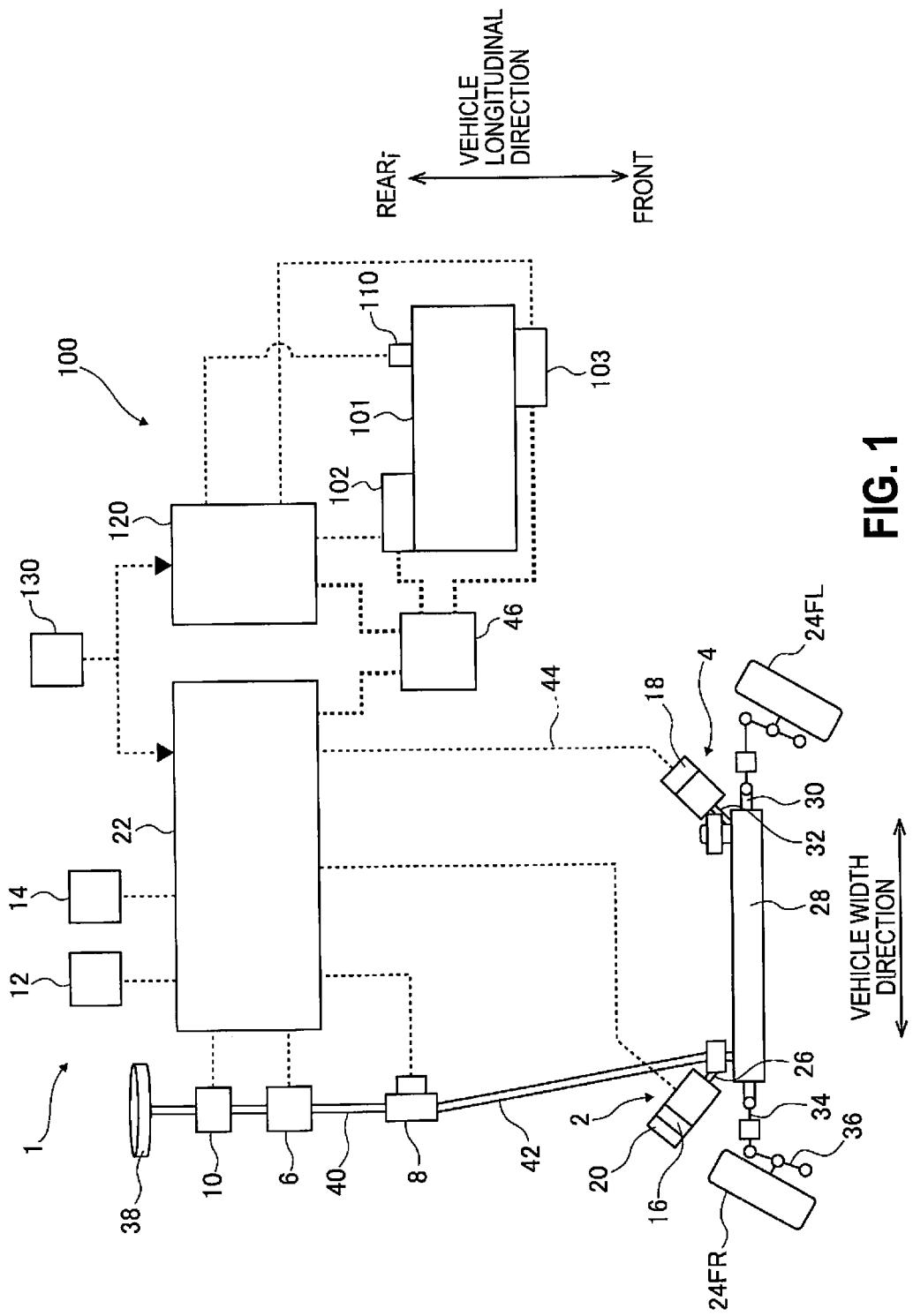
FIG. 1 is a diagram illustrating a schematic configuration of a vehicle equipped with a steer-by-wire system according to the first embodiment.

Preferred embodiments for realizing a steer-by-wire control method and a steer-by-wire system are described below based on the embodiments illustrated in the drawings.

First Embodiment

FIG. 1 is a diagram illustrating a schematic configuration of a vehicle equipped with a steer-by-wire system according to the first embodiment. A vehicle according to the first embodiment comprises a steer-by-wire system 1 and an engine device 100 as a drive source. The engine device 100 comprises an engine 101, which is an internal combustion engine, a starter motor 102 for starting the engine, an alternator 103 that functions as a generator after the engine is started, an engine controller 120 that controls the engine operating state, and an engine rotation speed sensor 110 that detects the engine rotation speed. When the driver switches an ignition switch 130 to the on state, the supply of electric power from a battery 46 to the engine controller 120 is started, and the engine controller 120 is activated. The engine controller 120 supplies electric power from the battery 46 to the starter motor 102, and engine cranking is started. When fuel injection is started during engine cranking, the engine 101 is in a state of complete combustion and enters an idling state capable of autonomous rotation. At this time, the operation of the starter motor 102 is stopped and power generation is started by the alternator 103 using the engine torque to supply electric power to the battery 46. The engine rotation speed sensor 110 detects the engine rotation speed and outputs the engine rotation speed to the engine controller 120.

The steer-by-wire system 1 is a system (SBW system) referred to as steer-by-wire (SBW: Steer By Wire, hereinafter sometimes referred to as "SBW"). Here, in the SBW system, an actuator (for example, turning motor) is drivingly controlled according to an operation of a steering wheel (steering wheel), which is steered by the driver of the vehicle, to control the turning of the turning wheels, to thereby change the direction of progress of the vehicle. The drive control of the turning motor is carried out in a state in which the torque transmission path between the steering wheel and the turning wheels is mechanically separated by switching a clutch that is interposed between the steering wheel and the turning wheels to a disengaged state, which is the normal state. In addition, when carrying out the drive control of the turning motor, the clutch is switched to the disengaged state, a target turning angle corresponding to the turning angle of the steering wheel is calculated, and drive control is carried out according to this calculated target turning angle.

Then, for example, when an abnormality occurs in a part of the SBW system, such as a disconnection or when the voltage of the battery 46 mounted in the vehicle decreases and it becomes impossible to control the SBW system, the clutch, which is in the disengaged state, is switched to an engaged state to mechanically connect the torque transmission path. The turning of the turning wheels is thereby continued using the force that is applied to the steering wheel by the driver. In addition, an EPS (Electric Power Steering) control for outputting an assist torque from the turning motor is carried out according to the operating state (steering amount, steering torque, steering speed, etc.) of the steering wheel by the driver. The configuration of the vehicle may be a configuration comprising a control changeover switch disposed in the cabin interior, whereby the driver can freely switch from control by the SBW system to EPS control, by the driver operating the control changeover switch.

The steer-by-wire system 1 comprises a first turning motor 2, a second turning motor 4, a reaction force motor 6, a clutch 8, a steering angle sensor 10, a vehicle speed detection unit 12, and a yaw rate detection unit 14, as illustrated in FIG. 1. In addition, the steer-by-wire system 1 comprises a first turning motor angle sensor 16, a second turning motor angle sensor 18, a first turning motor torque sensor 20, and a steer-by-wire controller 22.

The first turning motor 2 is an electric motor that is driven in accordance with a turning motor drive current output by the steer-by-wire controller 22, and forms a turning actuator that controls the turning of the turning wheels 24 by rotating in accordance with the target turning angle described above. In addition, the first turning motor 2 outputs a first turning torque for turning the turning wheels 24 by being driven in accordance with the turning motor drive current. In addition to an electric motor, a power cylinder, a hydraulic circuit provided with a solenoid, or the like may be used as the turning actuator. Additionally, the first turning motor 2 comprises a rotatable first turning motor output shaft 26. A first turning output gear (not shown) formed using a pinion gear is provided on the distal end of the first turning motor output shaft 26. The first turning output gear meshes with a rack gear (not shown) provided between the two end portions of a rack shaft 30 that extends through the steering rack 28.

The second turning motor 4 is an electric motor that is driven in accordance with a turning motor drive current output by the steer-by-wire controller 22 and forms a turning actuator that controls the turning of the turning wheels 24 by rotating in accordance with the target turning angle described above, in the same manner as the first turning motor 2. In addition, the second turning motor 4 outputs a second turning torque for turning the turning wheels 24 by being driven in accordance with the turning motor drive current, in the same manner as the first turning motor 2. Additionally, the second turning motor 4 comprises a rotatable second turning motor output shaft 32. A second turning output gear (not shown), which is formed using a pinion gear and meshes with the rack gear, is provided on the distal end of the second turning motor output shaft 32.

The steering rack 28 is formed with a cylindrical shape, and the rack shaft 30 extends therethrough. The rack shaft 30 is displaced in the vehicle width direction according to the rotation of at least one of the first turning motor output shaft 26 and the second turning motor output shaft 32, that is, the rotation of at least one of the first turning output gear and the second turning output gear. In addition, the two ends of the rack shaft 30 are respectively connected to the turning wheels 24 via the tie rod 34 and the knuckle arm 36.

The turning wheels 24 are the front wheels (left and right front wheels) of the vehicle and are turned via the tie rod 34 and the knuckle arm 36 when the rack shaft 30 is displaced in the vehicle width direction in accordance with the rotation of at least one of the first turning motor output shaft 26 and the second turning motor output shaft 32. The direction of progress of the vehicle is thereby changed. In the first embodiment, a case in which the turning wheels 24 are formed by the left and right front wheels will be described. Along with the foregoing, in FIG. 1, the turning wheel 24 formed by the left front wheel is denoted by turning wheel 24FL, and the turning wheel 24 formed by the right front wheel is denoted by turning wheel 24FR.

The reaction force motor 6 is an electric motor that is driven in accordance with a reaction force motor drive current output by the steer-by-wire controller 22 and forms a reaction force actuator that is capable of outputting a steering reaction force to the steering wheel 38. The output of the steering reaction force is carried out by rotating a steering shaft 40 that is rotated together with the steering wheel 38. Here, the steering reaction force that is output by the reaction force motor 6 to the steering wheel 38 is calculated according to the tire axial force that is acting on the turning wheels 24, and the steering state of the steering wheel 38. This calculation is carried out in a state in which the torque transmission path between the steering wheel 38 and the turning wheels 24 is mechanically separated by switching a clutch 8 to a disengaged state. An appropriate steering reaction force is thereby transmitted to the driver that is steering the steering wheel 38. That is, the steering reaction force that is output by the reaction force motor 6 and input to the steering wheel 38 acts in the direction opposite to the steering direction in which the driver steers the steering wheel 38. In addition to an electric motor, a power cylinder, a hydraulic circuit provided with a solenoid, or the like may be used as the reaction force actuator.

The clutch 8 is interposed between the turning wheels 24 and the steering wheel 38, which is operated by the driver, and is switched to a disengaged state or an engaged state in accordance with a clutch command current output by the steer-by-wire controller 22. In a normal state in which the SBW control is operating normally, the clutch 8 is in the disengaged state. Here, if the clutch 8 is switched to the disengaged state, one end of the steering shaft 40 and one end of the pinion shaft 42 are separated. As a result, the torque transmission path between the steering wheel 38 and the turning wheels 24 is mechanically separated, such that the steering operation of the steering wheel 38 is not transmitted to the turning wheels 24. One end of the steering shaft 40 is rotated together with the steering wheel 38 by being connected to a steering side clutch plate (not shown) inside the clutch 8 at one end thereof, connected to the steering wheel 38 at the other end. In addition, one end of the pinion shaft 42 is connected to a turning side clutch plate (not shown) inside the clutch 8, and a gear (not shown) provided to the other end is meshed with the rack gear.

On the other hand, if the clutch 8 is switched to the engaged state, one end of the steering shaft 40 and one end of the pinion shaft 42 are connected. As a result, the torque transmission path between the steering wheel 38 and the turning wheels 24 is mechanically connected, such that the steering operation of the steering wheel 38 is transmitted to the turning wheels 24. The steering angle sensor 10 is formed using, for example, a rotary encoder, and is provided on the steering column (not shown) that rotatably supports the steering wheel 38.

In addition, the steering angle sensor 10 detects the current steering angle, which is the current rotation angle of the steering wheel 38 (steering operation amount), as an absolute angle. The steering angle sensor 10 then outputs an information signal that includes the detected current steering angle of the steering wheel 38 to the steer-by-wire controller 22. It should be noted that in recent years, as standard equipment, vehicles often contain a sensor that can detect the steering angle of the steering wheel 38. Thus, in the first embodiment, a case is described in which a sensor that can detect the steering angle of the steering wheel 38, which is the sensor already in place in the vehicle, is used as the steering angle sensor 10. A sensor that can detect the steering angle senses the position of the steering wheel 38 as an absolute angle and detects the steering angle at the point in time that the steering angle sensor 10 is activated over the entire steerable range.

The vehicle speed detection unit 12 is, for example, a well-known vehicle speed sensor, which detects the vehicle speed of the vehicle and outputs an information signal that includes the detected vehicle speed to the steer-by-wire controller 22. The yaw rate detection unit 14 detects the yaw rate of the vehicle and outputs an information signal that includes the detected yaw rate to the steer-by-wire controller 22. The first turning motor angle sensor 16 is formed using, for example, a resolver, and is provided to the first turning motor 2.

In addition, the first turning motor angle sensor 16 detects the rotation angle (turning angle) of the first turning motor 2. In other words, the first turning motor angle sensor 16 can detect the relative angle from the position at the start of detection to the current position, and detects the rotation angle of the first turning motor 2 after starting the detection of the first turning motor angle sensor 16. The first turning motor angle sensor 16 then outputs an information signal including the detected turning angle (hereinafter sometimes referred to as "first turning motor rotation angle") to the steer-by-wire controller 22.

The first turning motor torque sensor 20 is formed using, for example, a sensor having a torsion bar and is provided on the first turning motor 2. Additionally, the first turning motor torque sensor 20 detects the first turning motor torque, which is the torque that is generated when the first turning motor 2 is driven. The first turning motor torque sensor 20 then outputs an information signal including the detected first turning motor torque to the steer-by-wire controller 22. In the first embodiment, the first turning motor torque detected by the first turning motor torque sensor 20 is converted into steering torque, which is the torque that is applied to the steering wheel 38 by the driver. A case in which an information signal, which includes this converted steering torque, is output to the steer-by-wire controller 22 will be described.

The second turning motor angle sensor 18 is formed using, for example, a resolver, and is provided to the second turning motor 4, in the same manner as the first turning motor angle sensor 16. In addition, the second turning motor angle sensor 18 detects the rotation angle (turning angle) of the second turning motor 4. In other words, the second turning motor angle sensor 18 can detect the relative angle from the position at the start of detection to the current position, and detects the rotation angle of the second turning motor 4 after starting the detection of the second turning motor angle sensor 18. The second turning motor angle sensor 18 then outputs an information signal including the detected turning angle (hereinafter sometimes referred to as "second turning motor rotation angle") to the steer-by-wire controller 22.

The steer-by-wire controller 22 inputs and outputs information signals to/from the engine controller 120, the first turning motor 2, the second turning motor 4, the reaction force motor 6, the clutch 8, via a communication line 44 such as CAN (Controller Area Network), FlexRay, or the like. In addition, the steer-by-wire controller 22 receives as inputs information signals that are output by the steering angle sensor 10, the vehicle speed detection unit 12, the yaw rate detection unit 14, the first turning motor angle sensor 16, the second turning motor angle sensor 18, the first turning motor torque sensor 20, and the engine rotation speed sensor 110 via the communication line 44. Additionally, the steer-by-wire controller 22 acquires the state (voltage, battery capacity, etc.) of the battery 46. When the driver switches the ignition switch 130 to the on state, the supply of electric power from the battery 46 to the steer-by-wire controller 22 is started, and the steer-by-wire controller 22 is activated. The detailed configuration of the steer-by-wire controller 22 and the description of the specific processing carried out by the steer-by-wire controller 22 will be described below.

Figure 2:
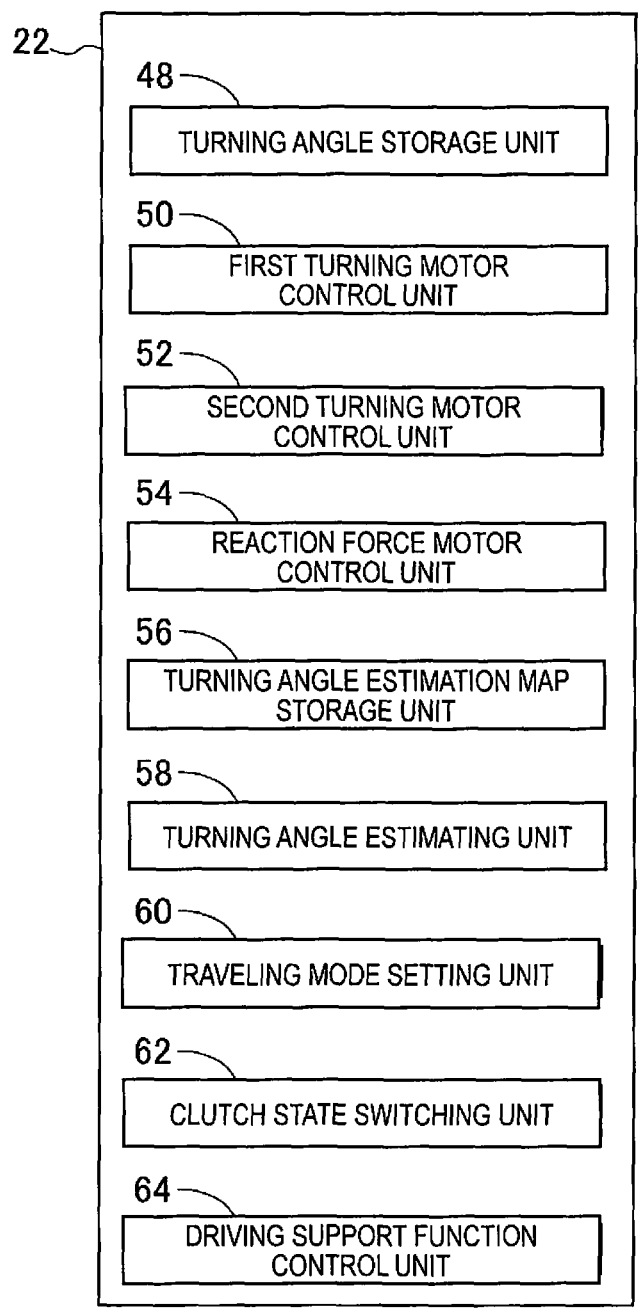
FIG. 2 is a block diagram illustrating the configuration of a steer-by-wire controller according to the first embodiment.

The detailed configuration of the steer-by-wire controller 22 will now be described, using FIGS. 2 to 5, with reference to FIG. 1. FIG. 2 is a block diagram illustrating the configuration of the steer-by-wire controller 22. The steer-by-wire controller 22 comprises a turning angle storage unit 48, a first turning motor control unit 50, a second turning motor control unit 52, a reaction force motor control unit 54, and a turning angle estimation map storage unit 56, as illustrated in FIG. 2. In addition, the steer-by-wire controller 22 comprises a turning angle estimation unit 58, a traveling mode setting unit 60, a clutch state switching unit 62, and a driving support function control unit 64.

The turning angle storage unit 48 is a non-volatile memory in which is stored the deviation between the steering angle of the steering wheel 38 and the rotation angles of the first turning motor 2 and the second turning motor 4 corresponding to the actual turning angle of the turning wheels 24 at the end of an SBW control. Here, a process for storing the initial values of the rotation angles of the first turning motor 2 and the second turning motor 4 in a state in which the steering angle and the turning angle are both adjusted to the neutral position, 0°, is carried out, for example, at the time of manufacture of the vehicle or during a calibration process before shipment of the vehicle. In addition, the rotation angles of the first turning motor 2 and the second turning motor 4 in a state in which the steering angle of the steering wheel 38 and the actual turning angle of the turning wheels 24 are both adjusted to the neutral position refer to the deviations of the first turning motor rotation angle and the second turning motor rotation angle with respect to the steering angle. Additionally, the deviations of the first turning motor rotation angle and the second turning motor rotation angle with respect to the steering angle are represented by, for example, the deviation angle (deg).

In the first embodiment, as one example, a case in which the rotation angle of the first turning motor 2, in a state in which the steering angle of the steering wheel 38 and the actual turning angle of the turning wheels 24 are both adjusted to the neutral position, is defined as when the deviation of the first turning motor rotation angle with respect to the steering angle is 0° will be described. Similarly, a case in which the rotation angle of the second turning motor 4, in a state in which the steering angle of the steering wheel 38 and the actual turning angle of the turning wheels 24 are both adjusted to the neutral position, is defined as when the deviation of the second turning motor rotation angle with respect to the steering angle is 0° will be described.

Additionally, the turning angle storage unit 48 carries out a process to correct (overwrite) the relationship between the stored steering angle and the rotation angles of the first turning motor and the second turning motor, in accordance with the turning angle of the turning wheels 24 estimated by the turning angle estimation unit 58. For example, when the turning angle of the turning wheels 24 estimated by the turning angle estimation unit 58 is 10° in the clockwise direction (direction for turning the vehicle to the right), this process is for correcting (overwriting) the deviation of the turning motor rotation angle with respect to the steering angle 10° in the counterclockwise direction.

The first turning motor control unit 50 calculates a first turning motor drive current for driving the first turning motor 2 and outputs this calculated first turning motor drive current to the first turning motor 2. Here, the first turning motor drive current is used to control the above-described first turning torque; a target turning angle corresponding to the operation of the steering wheel 38 is calculated, and the driving of the first turning motor 2 is controlled in accordance with this calculated target turning angle. In addition, the first turning motor drive current is calculated by correcting a turning motor current command using the command value of the current that is actually supplied to the first turning motor 2, and the rotation angle of the first turning motor 2 that is, stored in the turning angle storage unit 48.

Additionally, the first turning motor control unit 50 estimates the temperature of the first turning motor 2 based on the command value of the current that is actually supplied to the first turning motor 2. Furthermore, an information signal that includes the estimated temperature of the first turning motor 2 is output to the traveling mode setting unit 60. This is used to determine overheating of the first turning motor 2 due to the flow of resistance heating current. The command value of the current that is actually supplied to the first turning motor 2 is measured, for example, by the incorporation and use of a substrate temperature sensor (not shown) in the first turning motor 2.

The second turning motor control unit 52 calculates a second turning motor drive current for driving the second turning motor 4 and outputs this calculated second turning motor drive current to the second turning motor 4. Here, the second turning motor drive current is used to control the above-described second turning torque; a target turning angle corresponding to the operation of the steering wheel 38 is calculated, and the driving of the second turning motor 4 is controlled in accordance with this calculated target turning angle. In addition, the second turning motor drive current is calculated by correcting a turning motor current command using the command value of the current that is actually supplied to the second turning motor 4, and the rotation angle of the second turning motor 4 that is stored in the turning angle storage unit 48. Additionally, the second turning motor control unit 52 estimates the temperature of the second turning motor 4 based on the command value of the current that is actually supplied to the second turning motor 4, in the same manner as the first turning motor control unit 50. Furthermore, an information signal that includes the estimated temperature of the second turning motor 4 is output to the traveling mode setting unit 60.

The reaction force motor control unit 54 calculates a reaction force motor drive current for driving the reaction force motor 6 and outputs this calculated reaction force motor drive current to the reaction force motor 6. Here, the calculation of the reaction force motor drive current is carried out based on the value of the current that is actually supplied to the reaction force motor 6. Additionally, the reaction force motor control unit 54 estimates the temperature of the reaction force motor 6 based on the value of the current that is actually supplied to the reaction force motor 6, in the same manner as the first turning motor control unit 50. Furthermore, an information signal that includes the estimated temperature of the reaction force motor 6 is output to the traveling mode setting unit 60.

Figure 3:
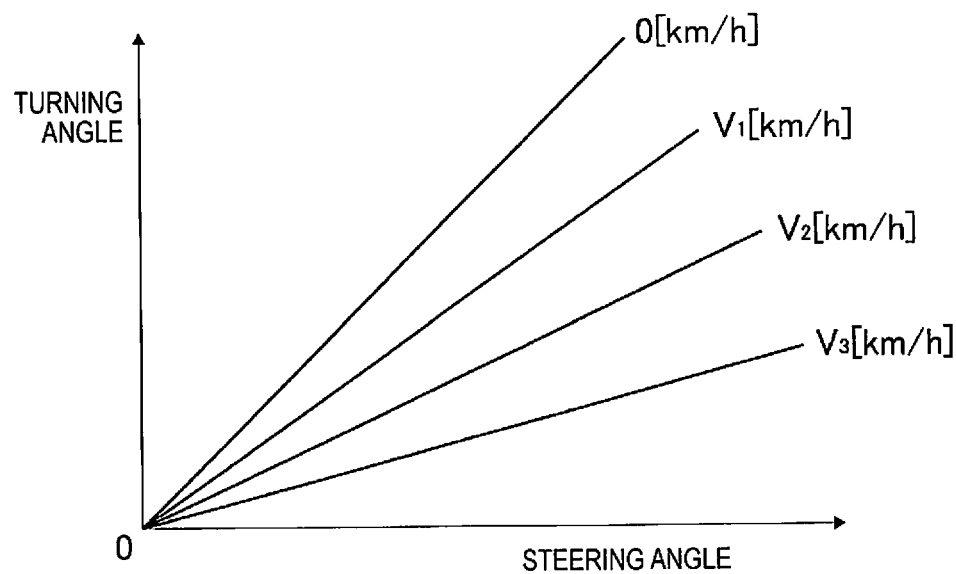
FIG. 3 is a turning angle estimation map according to the first embodiment.

The turning angle estimation map storage unit 56 is used for the storage of maps for estimating the turning angle of the turning wheels 24 based on the operation amount of the steering wheel 38 by the driver and the speed of the vehicle (vehicle speed). Here, the maps that are stored in the turning angle estimation map storage unit 56 are a turning angle estimation map illustrated in FIG. 3 and a limit angle setting map illustrated in FIG. 4. FIG. 3 shows the turning angle estimation map, and FIG. 4 shows the limit angle setting map.

The horizontal axis of the turning angle estimation map as illustrated in FIG. 3 is the steering angle, and the vertical axis is the turning angle. In addition, the turning angle estimation map stores the amount of change in the turning angle corresponding to the change in the steering angle, in accordance with the vehicle speed that is set in advance, as illustrated by the positively sloped lines in the drawing. Here, regarding the amount of change indicated by the positively sloped line in the turning angle estimation map, the amount of change in the turning angle with respect to the change in the steering angle is maximum when the vehicle speed is 0 [km/h]. In addition, regarding the amount of change indicated by the positively sloped line in the turning angle estimation map, the amount of change in the turning angle with respect to the change in the steering angle decreases, as the vehicle speed changes from 0 [km/h] to V3. The magnitudes of vehicle speeds V1 to V3 shown in the turning angle estimation map have the relationship "V1<V2<V3." That is, regarding the amount of change indicated by the positively sloped line in the turning angle estimation map, the amount of change in the turning angle with respect to the change in the steering angle decreases as the vehicle speed increases.

Figure 4:
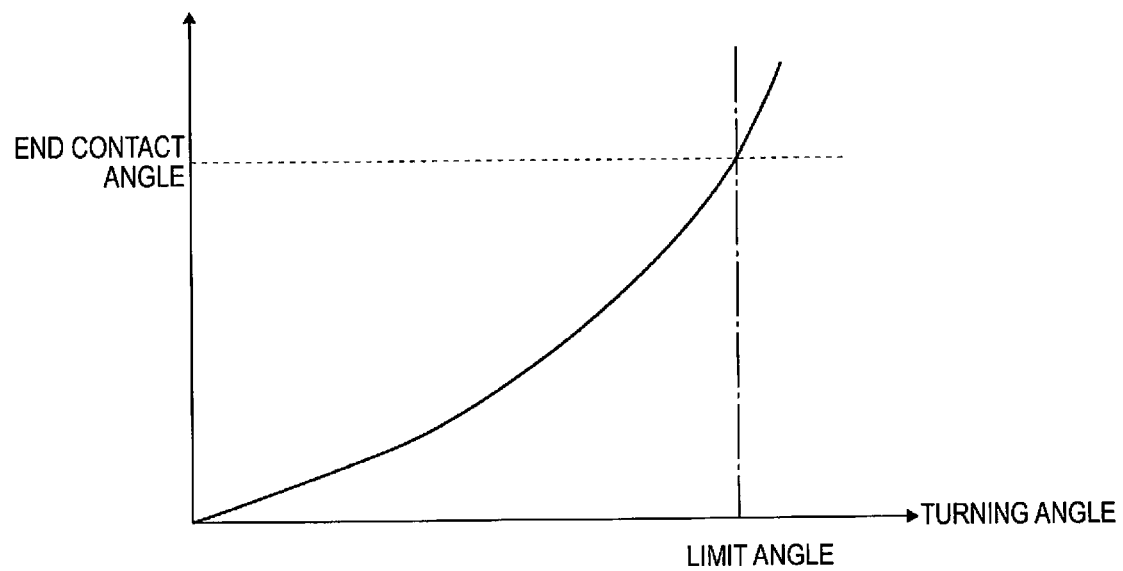
FIG. 4 is a limit angle setting map according to the first embodiment.

The horizontal axis of the limit angle setting map illustrated in FIG. 4 is the turning angle. In addition, the vertical axis of the limit angle setting map is the end contact angle, which is the turning limit angle from the neutral position of the turning wheels 24 (for example, 500 (deg)). Therefore, when the turning angle increases and reaches the end contact angle, the turning angle of the turning wheels 24 will reach the limit angle, which is the upper limit value, as illustrated in the drawing. Here, the end contact angle is the limit of the turning angle to which the turning wheels 24 can be turned, and is set in advance, for example, during design, manufacture, or factory shipment of the vehicle. That is, if the turning angle of the turning wheels 24 has reached the end contact angle, the turning angle of the turning wheels 24 will not change (increase) despite further turning of the steering wheel 38.

Information signals output by the steering angle sensor 10, the vehicle speed detection unit 12, the first turning motor angle sensor 16, and the second turning motor angle sensor 18 are input to the turning angle estimation unit 58. Additionally, the turning angle estimation unit 58 detects the voltage of the battery 46. In addition to the foregoing, the turning angle estimation map and the limit angle setting map that are stored in the turning angle estimation map storage unit 56 are referenced. Then, when the voltage of the battery 46 becomes equal to or greater than a preset voltage threshold from a level below the voltage threshold, the current steering angle detected by the steering angle sensor 10 and the vehicle speed detected by the vehicle speed detection unit 12 are input to the turning angle estimation map. The turning angle of the turning wheels 24 corresponding to the current steering angle and the vehicle speed is thereby estimated. At this time, if the estimated turning angle exceeds a limit angle shown in the limit angle setting map, the turning angle that is estimated in accordance with the current steering angle and the vehicle speed is corrected to the limit angle.

Here, the voltage threshold is the voltage at which the readout state of the rotation angles of the first turning motor 2 and the second turning motor 4 stored in the turning angle storage unit 48 becomes abnormal. That is, the voltage threshold is the voltage at which the SBW control and the control of the driving support function, described further below, cannot be carried out. That is, when the voltage of the battery 46 becomes equal to or greater than the voltage threshold from a level below the voltage threshold, the turning angle estimation unit 58 estimates the turning angle of the turning wheels 24 based on the current steering angle detected by the steering angle sensor 10 and the vehicle speed detected by the vehicle speed detection unit 12.

The traveling mode setting unit 60 sets the traveling mode of the vehicle based on, for example, the results of the processes carried out by the first turning motor control unit 50, the second turning motor control unit 52, and the reaction force motor control unit 54, and the states of the first turning motor 2, the second turning motor 4, and the reaction force motor 6. In addition, the traveling mode setting unit 60 sets the traveling mode of the vehicle, for example, according to the readout state of the rotation angles of the first turning motor 2 and the second turning motor 4 stored in the turning angle storage unit 48.

Specifically, when the diagnostic results of the first turning motor control unit 50, the second turning motor control unit 52, and the reaction force motor control unit 54, and the readout state of the rotation angle are all normal (indicated by "○" in the drawing), the traveling mode is set to the normal SBW control, as illustrated in FIG. 5. A normal SBW control is an SBW control that uses the first turning motor 2, the second turning motor 4, and the reaction force motor 6 (indicated by "2M-SBW" in the drawing). In addition, FIG. 5 is a table used for setting the traveling mode with the traveling mode setting unit 60.

Additionally, when the readout state of the rotation angle is abnormal (indicated by "X" in the drawing), that is, when the turning angle information stored in the turning angle storage unit 48 cannot be read out, the traveling mode is set to Tmp-EPS control, as illustrated in FIG. 5. A Tmp-EPS control is an EPS control that uses the first turning motor 2, the second turning motor 4, and the reaction force motor 6 (indicated by "Tmp-EPS (2M-EPS)" in the drawing), which is an EPS control that is temporarily carried out.

In FIG. 5, "1M-EPS" indicates an EPS control that does not use all of the first turning motor 2, the second turning motor 4, and the reaction force motor 6, but uses at least the first turning motor 2. In addition, in FIG. 5, 1M-SBW indicates an SBW control that uses the second turning motor 4 and the reaction force motor 6. Additionally, in FIG. 5, "MS" indicates a traveling mode in which not all of the motors are used, the clutch 8 is placed in the engaged state, and the turning wheels 24 are turned by the steering operation of the steering wheel 38 by the driver.

The clutch state switching unit 62 switches the state of the clutch 8 based on the state of the ignition switch 130 of the vehicle, the traveling mode set by the traveling mode setting unit 60, and the voltage of the battery 46. Specifically, when the ignition switch 130 is in the on state, a clutch current command for switching the clutch 8 to the disengaged state is output to the clutch 8. In addition, when the traveling mode setting unit 60 sets the traveling mode to "2M-SBW" or "1M-SBW," a clutch current command for switching the clutch 8 to the disengaged state is output to the clutch 8. The determination that the ignition switch 130 is in the on state is not limited to when the engine is running. In this case, it may be determined that the ignition switch 130 is in the on state when it is detected that the ignition switch 130 has been operated by the driver or the like, even if the engine 101 is stopped. This also applies to the following description. Additionally, a case in which the ignition switch 130 of the vehicle is in the on state even if the engine 101 is stopped is, for example, when the operating position of the ignition switch 130 is ACC (accessory position).

In addition, in the case in which the ignition switch 130 is in the on state, a clutch current command for switching the clutch 8, which is in the disengaged state, to the engaged state, is output to the clutch 8 when the voltage of the battery 46 goes below the voltage threshold. Additionally, when the voltage, which had dropped below the voltage threshold, becomes equal to or greater than the voltage threshold, a clutch current command for switching the clutch 8, which is in the engaged state, to the disengaged state, in accordance with the traveling state of the vehicle, is output to the clutch 8. The process for switching the clutch 8, which is in the engaged state, to the disengaged state, in accordance with the traveling state of the vehicle, when the voltage, which had dropped below the voltage threshold, becomes equal to or greater than the voltage threshold, will be described further below.

On the other hand, when the ignition switch 130 is in the off state, a clutch current command for switching the clutch 8 to the engaged state is output to the clutch 8. In addition, when the traveling mode setting unit 60 sets the traveling mode to any one of "Tmp-EPS (2M-EPS)," "1M-EPS," and "MS," a clutch current command for switching the clutch 8 to the engaged state is output to the clutch 8.

The driving support function control unit 64 carries out processes for controlling the steering state, the braking force, the driving force, and the like, of the vehicle, in order to execute the driving support function, such as ABS control, VDC control, in-lane traveling maintenance support control, and the like. Here, an ABS (Antilock Brake System) control is used to prevent locking up of the wheels, and a VDC (Vehicle Dynamics Control) control is used to suppress skidding of the vehicle. In addition, an in-lane travel maintenance support control is used to prevent a vehicle traveling within the lane from deviating outside of the lane.

Additionally, the driving support function control unit 64 uses the turning angle estimated by the turning angle estimation unit 58 in order to carry out the various driving support functions described above. In addition, when receiving an input of a turning angle correction in-progress flag from the traveling mode setting unit 60, the driving support function control unit 64 uses the turning angle estimated by the turning angle estimation unit 58 as a provisional turning angle to carry out various driving support functions. This is a process for reducing the degree of importance of the turning angle to a level below that of the other parameters (vehicle speed, and the like), compared to when the turning angle estimated by the turning angle estimation unit 58 is used as the normal turning angle, for example, in a VDC control, or the like.

In addition, a turning angle correction in-progress flag is used to indicate a state in which a new turning angle is being estimated, when the turning angle previously estimated at the point in time in which the ignition switch 130 was placed in the off state could not be stored in the turning angle storage unit 48. A case in which the previously estimated turning angle cannot be stored in the turning angle storage unit 48 is a case in which the supply of electric power from the battery 46 to the steer-by-wire controller 22 (ECU) is interrupted when in a state of not being subject to control. Here, cases in which the supply of electric power from the battery 46 to the steer-by-wire controller 22 is interrupted when in a state of not being subject to control are, for example, a momentary reduction in voltage (instantaneous reduction) of the battery, cable detachment from the battery terminal, and the like. In this state, if the supply of electric power to the steer-by-wire controller 22 is interrupted when in a state of not being subject to control, there is the risk that a problem will occur in which an SBW control cannot be carried out.

Figure 6:
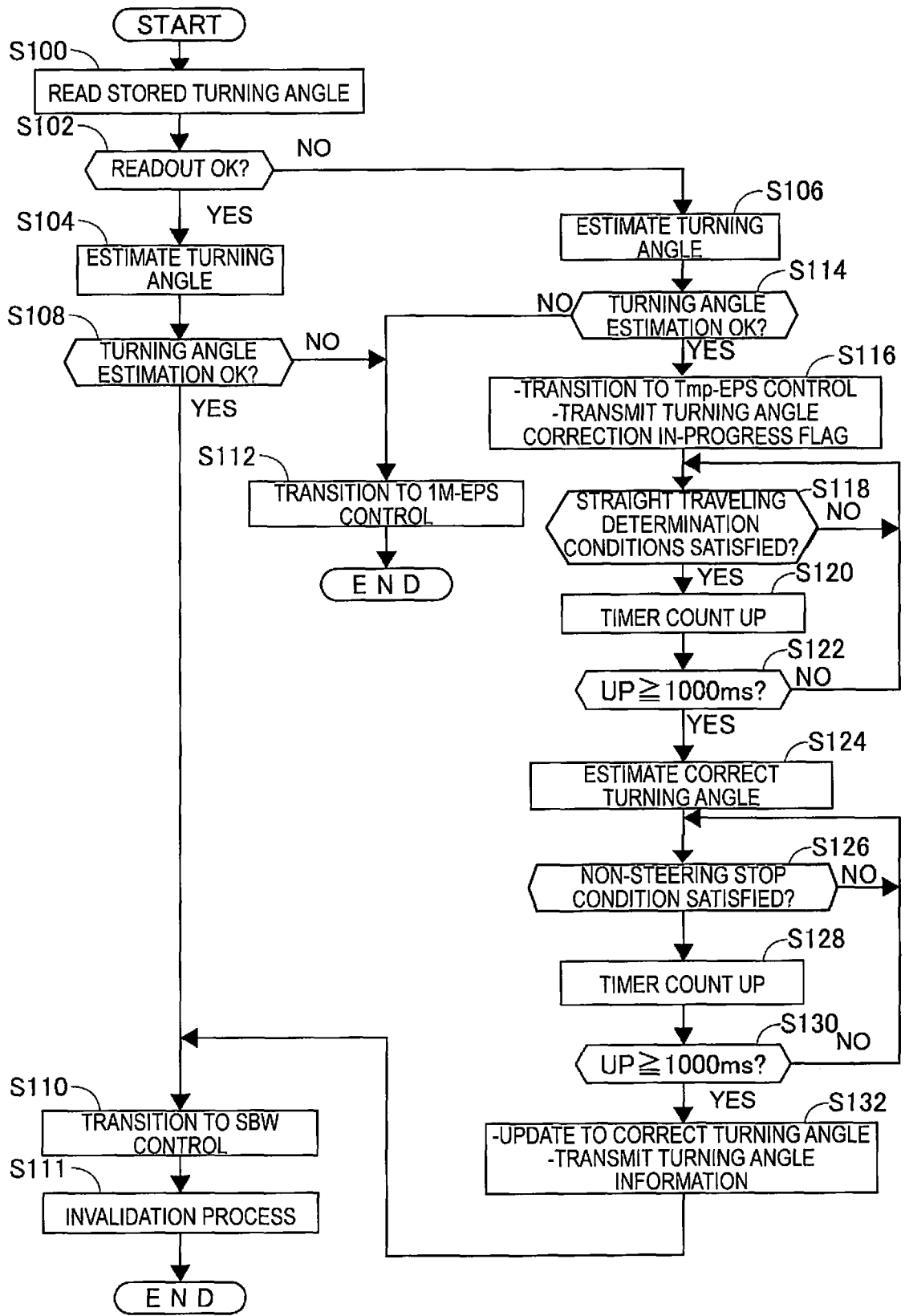
FIG. 6 is a flowchart illustrating a process carried out by the steer-by-wire controller according to the first embodiment.

Next, the specific processing carried out by the steer-by-wire controller 22 will be described, using FIGS. 6 and 7, with reference to FIGS. 1 to 5. FIG. 6 is a flowchart illustrating the process carried out by the steer-by-wire controller 22. The process carried out by the steer-by-wire controller 22 is started (START) when the ignition switch 130, which is in the off state, is switched to the on state, or, when the voltage of the battery 46 goes below the voltage threshold and then becomes equal to or greater than the voltage threshold, as illustrated in FIG. 6.

When the process carried out by the steer-by-wire controller 22 is started, first, in Step S100, a process to read out the turning angle information stored in the turning angle storage unit 48 ("read stored turning angle" shown in the drawing) is carried out. When the turning angle information stored in the turning angle storage unit 48 is read out in Step S100, the process carried out by the steer-by-wire controller 22 proceeds to Step S102.

In Step S102, a process is carried out to determine whether or not the process carried out in Step S100, that is, the process to read out the turning angle information stored in the turning angle storage unit 48, has been carried out normally ("readout OK?" shown in the drawing).

If it is determined in Step S102 that the process to read out the turning angle information stored in the turning angle storage unit 48 has been carried out normally ("Yes" shown in the drawing), the process carried out by the steer-by-wire controller 22 proceeds to Step S104. On the other hand, if it is determined in Step S102 that the process to read out the turning angle information stored in the turning angle storage unit 48 has not been carried out normally ("No" shown in the drawing), the process carried out by the steer-by-wire controller 22 proceeds to Step S106.

In Step S104, a process to estimate the turning angle of the turning wheels 24 ("estimate turning angle" shown in the drawing) is carried out by the turning angle estimation unit 58. When the process of estimating the turning angle of the turning wheels 24 is carried out in Step S104, the process carried out by the steer-by-wire controller 22 proceeds to Step S108.

In Step S106, a process to estimate the turning angle of the turning wheels 24 ("estimate turning angle" shown in the drawing) is carried out by the turning angle estimation unit 58, in the same manner as Step S104. When the process of estimating the turning angle of the turning wheels 24 is carried out in Step S106, the process carried out by the steer-by-wire controller 22 proceeds to Step S114.

In Step S108, a process is carried out to determine whether or not the process carried out in Step S104, that is, the process of estimating the turning angle of the turning wheels 24 by the turning angle estimation unit 58, has been carried out normally ("turning angle estimation OK?" shown in the drawing).

If it is determined in Step S108 that the process of estimating the turning angle has been carried out normally ("Yes" shown in the drawing), the process carried out by the steer-by-wire controller 22 proceeds to Step S110.

On the other hand, if it is determined in Step S108 that the process of estimating the turning angle has not been carried out normally ("No" shown in the drawing), the process carried out by the steer-by-wire controller 22 proceeds to Step S112. Here, a case in which the process of estimating the turning angle has not been carried out normally is a case in which, for example, one of the turning angle sensor 10, the vehicle speed detection unit 12, the first turning motor angle sensor 16, and the second turning motor angle sensor 18 has malfunctioned. In addition, a case in which the process of estimating the turning angle has not been carried out normally is a case in which, for example, one of the first turning motor control unit 50, the second turning motor control unit 52, and the reaction force motor control unit 54 has malfunctioned (calculation failure).

In Step S110, a process is carried out to set the traveling mode of the vehicle to "2M-SBW" or "1M-SBW" with the traveling mode setting unit 60 ("transition to SBW control" shown in the drawing). When the traveling mode of the vehicle is set to "2M-SBW" or "1M-SBW" in Step S110, the process carried out by the steer-by-wire controller 22 is ended (END).

In Step S111, an invalidation process for disengaging the clutch 8 and invalidating the turning angle information stored in the turning angle storage unit 48 is executed. The invalidation process may be carried out at the same time as, or immediately before, Step S110. Details of the invalidation process will be described further below.

In Step S112, a process is carried out to set the traveling mode of the vehicle to "1M-EPS" with the traveling mode setting unit 60 ("transition to 1M-EPS control" shown in the drawing). When the traveling mode of the vehicle is set to "1M-EPS" in Step S112, the process carried out by the steer-by-wire controller 22 is ended (END).

In Step S114, a process is carried out to determine whether or not the process carried out in Step S106, that is, the process of estimating the turning angle of the turning wheels 24 with the turning angle estimation unit 58 has been carried out normally ("turning angle estimation OK?" shown in the drawing).

If it is determined in Step S114 that the process of estimating the turning angle has been carried out normally ("Yes" shown in the drawing), the process carried out by the steer-by-wire controller 22 proceeds to Step S116.

On the other hand, if it is determined in Step S114 that the process of estimating the turning angle has not been carried out normally ("No" shown in the drawing), the process carried out by the steer-by-wire controller 22 proceeds to Step S112. Here, a case in which the process of estimating the turning angle has not been carried out normally is a case similar to the process carried out in Step S108 described above.

In Step S116, a process is carried out to set the traveling mode of the vehicle to "Tmp-EPS" with the traveling mode setting unit 60 ("transition to Tmp-EPS control" shown in the drawing). In addition, in Step S116, a process is carried out to transmit a turning angle correction in-progress flag to the driving support function control unit 64 ("transmit turning angle correction in-progress flag" shown in the drawing). When the traveling mode of the vehicle is set to "Tmp-EPS" and a turning angle correction in-progress flag is transmitted to the driving support function control unit 64 in Step S116, the process carried out by the steer-by-wire controller 22 proceeds to Step S118.

In Step S118, a process is carried out to determine whether or not the vehicle is traveling straight, by determining whether or not all of the three conditions C1-C3 shown below are satisfied ("straight traveling determination conditions satisfied?" shown in the drawing).

C1. The vehicle speed detected by the vehicle speed detection unit 12 is equal to or greater than a preset vehicle speed threshold value. In the first embodiment, a case in which the vehicle speed threshold value is set to 40 [km/h] will be described as an example.

C2. The absolute value of the yaw rate of the vehicle detected by the yaw rate detection unit 14 is equal to or less than a preset yaw rate threshold value. In the first embodiment, a case in which the yaw rate threshold value is set to 0.2 [deg/s] will be described as an example.

C3. The absolute value of the steering angular velocity based on the amount of change per unit time of the current steering angle detected by the steering angle sensor 10 is equal to or less than a preset steering angular velocity threshold value for determining straight traveling. In the first embodiment, a case in which the steering angular velocity threshold value for determining straight traveling is set to 20 [deg/s] will be described as an example.

The conditions C1-C3 described above are set in advance, and are, for example, stored in the steer-by-wire controller 22.

If it is determined in Step S118 that all three conditions C1-C3 described above are satisfied and it is determined that the vehicle is traveling straight ("Yes" shown in the drawing), the process carried out by the steer-by-wire controller 22 proceeds to Step S120.

On the other hand, if it is determined in Step S118 that at least one of the three conditions C1-C3 described above is not satisfied and it is determined that the vehicle is not traveling straight ("No" shown in the drawing), the process carried out by the steer-by-wire controller 22 repeats the process of Step S118.

In Step S120, a process is carried out to measure the time during which the straight traveling state of the vehicle is maintained ("timer count up" shown in the drawing). When the process is carried out to measure the time during which the straight traveling state of the vehicle is maintained of Step S120, the process carried out by the steer-by-wire controller 22 proceeds to Step S122.

In Step S122, a process is carried out to determine whether or not the time during which the straight traveling state of the vehicle is maintained, the measurement of which is started in the process of Step S120, is equal to or greater than a preset straight traveling determination time threshold value ("UP≥1000 ms?" shown in the drawing). In the first embodiment, a case in which the straight traveling determination time threshold value is set to 1000 ms will be described as an example.

If it is determined in Step S122 that the time during which the straight traveling state of the vehicle is maintained is equal to or greater than the straight traveling determination time threshold value ("Yes" shown in the drawing), the process carried out by the steer-by-wire controller 22 proceeds to Step S124.

On the other hand, if it is determined in Step S122 that the time during which the straight traveling state of the vehicle is maintained is less than the straight traveling determination time threshold value ("No" shown in the drawing), the process carried out by the steer-by-wire controller 22 proceeds to Step S118.

In Step S124, a process to estimate the turning angle of the turning wheels 24 is carried out by the turning angle estimation unit 58.

Here, unlike Step S104 and Step S106 described above, in Step S124, the process of estimating the turning angle of the turning wheels 24 is carried out in a state in which the vehicle is traveling straight, that is, when the steering angle and the turning angle are in the neutral position or in the vicinity of the neutral position. Therefore, in Step S124, a process is carried out to estimate the turning angle in a state in which the steering angle of the steering wheel 38 and the actual turning angle of the turning wheels 24 are both adjusted to the neutral position, 0°, that is, the correct turning angle ("estimate correct turning angle" shown in the drawing). When the process of estimating the turning angle of the turning wheels 24 is carried out in Step S124, the process carried out by the steer-by-wire controller 22 proceeds to Step S126.

Here, for example, if the turning angle at the point in time at which the vehicle is determined to be traveling straight in Step S118 is estimated to be 3°, a "correct turning angle" is the angle obtained by subtracting 3° from the estimated turning angle in the subsequent process. This is because, in a state in which the vehicle is traveling straight, the steering angle of the steering wheel 38 and the actual turning angle of the turning wheels 24 are both at the neutral position: 0°. In addition, this is because an angle that departs from 0° in a state in which the vehicle is traveling straight is an angular deviation that occurs due to, for example, an error in the calculation process, engagement of the clutch 8, twisting of a shaft that configures the torque transmission path, or the like.

In Step S126, a process is carried out to determine whether or not the vehicle is stopped in a state in which the steering wheel 38 is not being steered, by determining whether or not all three conditions C4-C6 shown below are satisfied ("non-steering stop condition satisfied?" shown in the drawing). In the following description, there are cases in which a state in which the steering wheel 38 is not being steered is referred to as the "non-steering state."

C4. The vehicle speed detected by the vehicle speed detection unit 12 is 0 [km/h].

C5. The absolute value of the steering angular velocity based on the amount of change per unit time of the current steering angle detected by the steering angle sensor 10 is equal to or less than a preset steering angular velocity threshold value for determining non-steering. In the first embodiment, a case in which the steering angular velocity threshold value for determining non-steering is set to 10 [deg/s] will be described as an example.

C6. The absolute value of the first turning motor torque detected by the first turning motor torque sensor 20 is equal to or less than a preset torque threshold value for determining non-steering. In the first embodiment, a case in which the torque threshold value for determining non-steering is set to 1 [Nm] will be described as an example.

The conditions C4-C6 described above are set in advance, and are, for example, stored in the steer-by-wire controller 22. In addition, a state in which the above-described conditions C5 and C6 are satisfied corresponds to the preset non-steering state.

If it is determined in Step S126 that the vehicle is stopped in a non-steering state ("Yes" shown in the drawing), the process carried out by the steer-by-wire controller 22 proceeds to Step S128. This is a case in which it is determined that all three conditions C4-C6 described above are satisfied.

On the other hand, if it is determined in Step S126 that at least one of the non-steering state conditions and the vehicle stopped condition is not satisfied ("No" shown in the drawing), the process carried out by the steer-by-wire controller 22 repeats the process of Step S126. This is a case in which it is determined that at least one of the three conditions C4-C6 described above is not satisfied.

In Step S128, a process is carried out to measure the time during which the state in which the vehicle is determined to be stopped in the non-steering state is continued ("timer count up" shown in the drawing). When the process is carried out to measure the time during which the state in which the vehicle is determined to be stopped in the non-steering state is continued in Step S128, the process carried out by the steer-by-wire controller 22 proceeds to Step S130.

In Step S130, a process is carried out to determine whether or not the time during which the state in which the vehicle is determined to be stopped in the non-steering state is continued, the measurement of which is started in the process of Step S128, is equal to or greater than a preset non-steering stop determination time threshold value ("UP≥1000 ms?" shown in the drawing). In the first embodiment, a case in which the non-steering stop determination time threshold value is set to 1000 ms will be described as an example.

If it is determined in Step S130 that the time during which the state in which the vehicle is determined to be stopped in the non-steering state is continued is equal to or greater than the non-steering stop determination time threshold value ("Yes" shown in the drawing), the process carried out by the steer-by-wire controller 22 proceeds to Step S132.

On the other hand, if it is determined in Step S130 that the time during which the state in which the vehicle is determined to be stopped in the non-steering state is continued is less than the non-steering stop determination time threshold value ("No" shown in the drawing), the process carried out by the steer-by-wire controller 22 proceeds to Step S126.

In Step S132, a process is carried out to correct (overwrite) the relationship between the steering angle stored in the turning angle storage unit 48 and rotation angles of the first turning motor and the second turning motor, using the correct turning angle estimated in Step S124. As a result, in Step S132, a process is carried out to update the turning motor rotation angle with respect to turning angle stored in the turning angle storage unit 48 using the correct turning angle estimated in Step S124 ("update to correct turning angle" shown in the drawing).

In addition, in Step S132, a process is carried out to transmit an information signal that includes the estimated correct turning angle to the driving support function control unit 64 ("transmit turning angle information" shown in the drawing). Thus, the transmission of the turning angle correction in-progress flag to the driving support function control unit 64 is stopped. Here, in Step S132, the information signal that is transmitted to the driving support function control unit 64 is an information signal that includes a continuous change turning angle, which is the turning angle whereby an estimated pre-engagement turning angle is continuously changed to an estimated turning angle following a determination of straight traveling. The estimated pre-engagement turning angle is the turning angle estimated in Step S106, that is, the turning angle of the turning wheels 24 estimated immediately before the clutch 8, which is in the disengaged state, is switched to the engaged state. Additionally, the estimated turning angle following a determination of straight traveling is the turning angle estimated in Step S124, that is, the turning angle of the turning wheels 24 estimated when the straight traveling state of the vehicle is determined.

Figure 7:
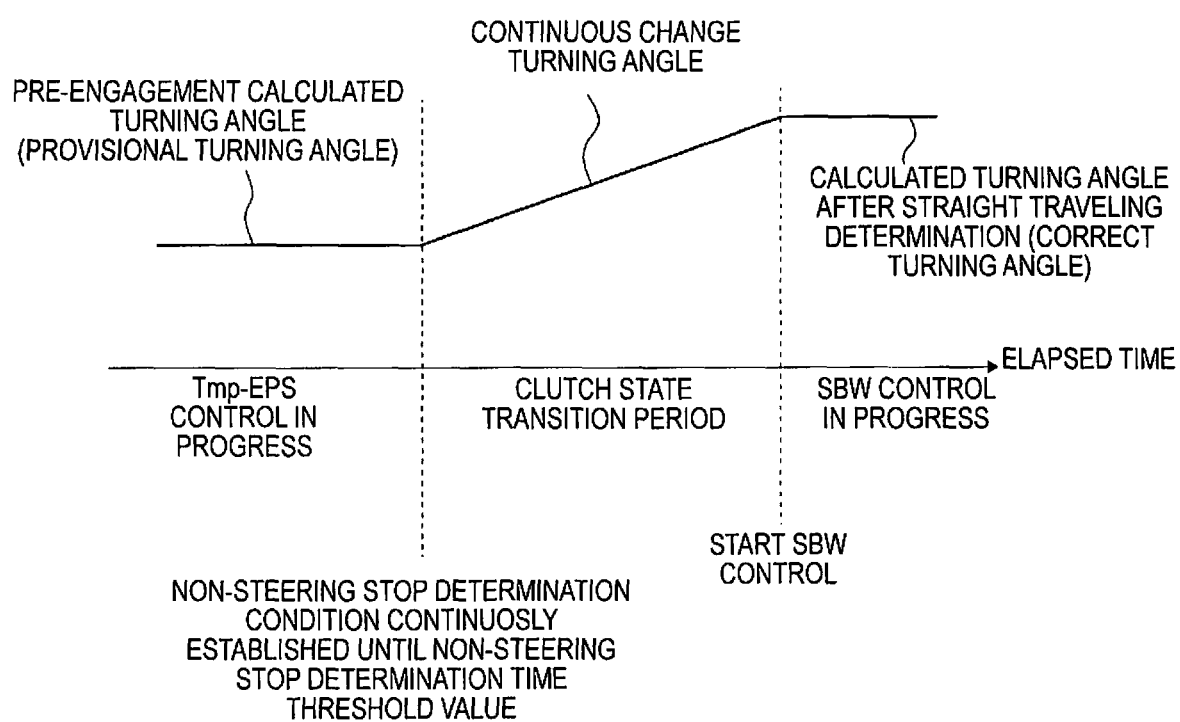
FIG. 7 is a timing chart illustrating the process carried out by the steer-by-wire controller according to the first embodiment.

That is, in the first embodiment, the turning angle information estimated by the turning angle estimation unit 58 during a clutch state transition period is continuously changed from the estimated pre-engagement turning angle (provisional turning angle) to the estimated turning angle following a determination of straight traveling (correct turning angle), as illustrated in FIG. 7. Here, the clutch state transition period is the period during which the traveling mode of the vehicle is switched from "Tmp-EPS" to "2M-SBW" or "1M-SBW." FIG. 7 is a timing chart illustrating the process carried out between Step S126 and Step S132, and the process that transitions from Step S132 to Step S110, from among the processes carried out by the steer-by-wire controller 22.

When the turning motor rotation angle (turning angle information) with respect to the steering angle stored in the turning angle storage unit 48 is updated and the information signal including the continuous change turning angle is transmitted to the driving support function control unit 64 in Step S132, the process carried out by the steer-by-wire controller 22 proceeds to Step S110. Here, in the first embodiment, for the case in which the process carried out by the steer-by-wire controller 22 transitions from Step S132 to Step S110, the traveling mode of the vehicle is set to "2M-SBW" or "1M-SBW" in Step S110. Thereafter, at the point in time at which the clutch 8 is switched to the disengaged state, an information signal that includes the estimated correct turning angle is transmitted to the driving support function control unit 64.

Therefore, for the case in which the process carried out by the steer-by-wire controller 22 transitions from Step S132 to Step S110, it becomes possible to carry out an SBW control based on the estimated turning angle following a determination of straight traveling (correct turning angle) estimated in Step S124.

In addition, in the first embodiment, for the case in which the process carried out by the steer-by-wire controller 22 transitions from Step S132 to Step S110, the driving support function is controlled using a continuous change turning angle, which continuously changes, during the clutch state transition period. Therefore, it becomes possible to suppress sudden changes in the control of the steering state, the braking force, the driving force, etc., of the vehicle, and to carry out smooth control of the driving support function, during the clutch state transition period.

Figure 8:
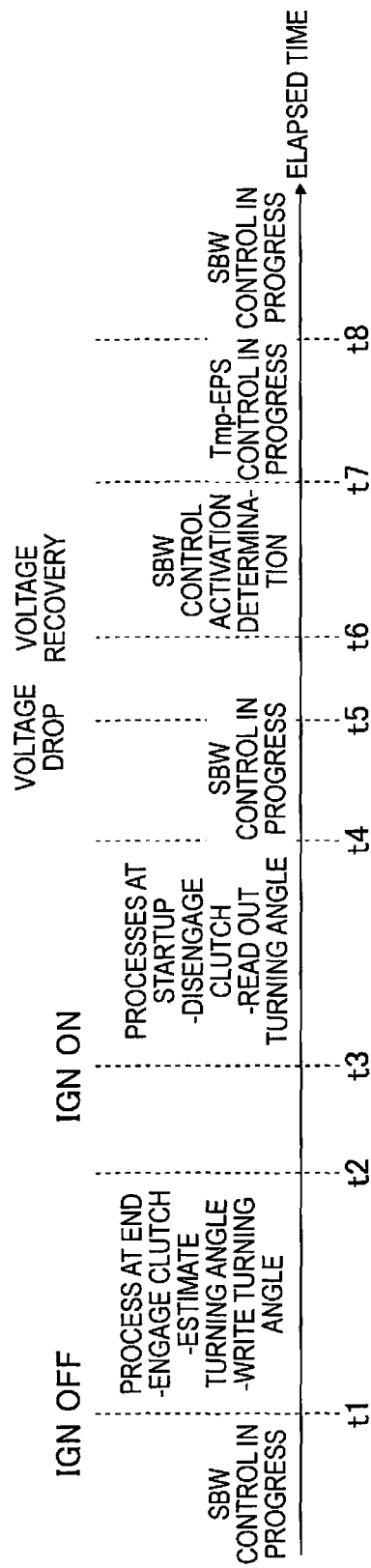
FIG. 8 is a timing chart illustrating the operation of a vehicle using the steer-by-wire system according to the first embodiment.

Next, one example of an operation that is carried out using the steer-by-wire system 1 according to the first embodiment will be described using FIG. 8, with reference to FIGS. 1 to 7. FIG. 8 is a timing chart illustrating the operation of a vehicle using the steer-by-wire system 1 according to the first embodiment. The timing chart shown in FIG. 8 starts from a state in which, during traveling, etc., of the vehicle, the ignition switch 130 is in the on state, the torque transmission path is mechanically separated, and the traveling mode of the vehicle is set to "2M-SBW" ("SBW control in progress" shown in the drawing). In a state in which the traveling mode of the vehicle is set to "2M-SBW" or "1M-SBW," a turning angle control that corresponds to the vehicle speed is carried out, such as a control to reduce the amount of change in the turning angle with respect to the steering angle to a greater extent during high-speed travel than during low-speed travel (variable gear control). In addition, the turning angle control that corresponds to the vehicle speed is carried out using the relationship between the turning motor rotation angle and the steering angle stored in the turning angle storage unit 48 (turning angle information), the current steering angle detected by the steering angle sensor 10, and the vehicle speed detected by the vehicle speed detection unit 12.

Then, for example, after parking the vehicle, or the like, the processes to be carried out at the end of an SBW control ("process at end" shown in the drawing) are carried out from time t1, when the driver switches the ignition switch 130 to the off state ("IGN OFF" shown in the drawing). Here, the processes to be carried out at the end of an SBW control include switching the clutch 8 from the disengaged state to the engaged state ("clutch engagement" shown in the drawing) and estimating the turning angle of the turning wheels 24 at time t1 ("estimate turning angle" shown in the drawing). The process to be carried out at the end of an SBW control also includes writing and storing the angular deviation between the steering angle and the estimated turning angle of the turning wheels 24 at time t1 in the turning angle storage unit 48 as turning angle information ("write turning angle" shown in the drawing). In the drawing, the point in time at which the processes to be carried out at the end of an SBW control is indicated as time t2.

After time t2, for example, when, during starting of the vehicle, the driver switches the ignition switch 130 to the on state ("IGN ON" shown in the drawing), the processes to be carried out at the time of activation of an SBW control ("process at startup" shown in the drawing) are carried out from this time t3. Here, a process to be carried out at the time of activation of an SBW control includes switching the clutch 8 from the engaged state to the disengaged state ("clutch disengagement" shown in the drawing). In addition, a process to be carried out at the time of activation of an SBW control includes reading out the turning angle information of the turning wheels 24 that was written to and stored in the turning angle storage unit 48 in the process to be carried out at the end of an SBW control ("read out turning angle" shown in the drawing), and then to invalidate the stored turning angle information.

Then, from time t4, when the processes to be carried out at the time of activation of an SBW control are completed, the traveling mode of the vehicle is set to "2M-SBW" to start the SBW control ("SBW control in progress" shown in the drawing).

Here, in a state in which the traveling mode of the vehicle is set to "2M-SBW," if the voltage of the battery 46 goes below the voltage threshold and then becomes equal to or greater than the voltage threshold, a process to determine whether or not to activate the SBW control is carried out ("SBW control activation determination" shown in the drawing). In the drawing, the point in time at which the voltage of the battery 46 goes below the voltage threshold ("voltage drop" shown in the drawing) is indicated as time t5. In addition, in the drawing, the point in time at which the voltage of the battery 46, which had dropped below the voltage threshold, becomes equal to or greater than the voltage threshold ("voltage restoration" shown in the drawing), and the point in time at which a process to determine whether or not to activate the SBW control, is indicated as time t6.

In the process to determine whether or not to activate the SBW control, a process is carried out to determine whether or not the process of Step S102 described above, that is, the process of reading out the turning angle information stored in the turning angle storage unit 48, has been carried out normally.

Here, in the following description, the case for which it is determined that the process of reading out the turning angle information stored in the turning angle storage unit 48 has not been carried out normally will be described. That is, in the following description, the case in which the process proceeds from Step S102 to Step S106 described above will be described. After it is determined that the process of reading out the turning angle information stored in the turning angle storage unit 48 has not been carried out normally, a process is carried out to determine whether or not the process of Step S114 described above, that is, the process in which the turning angle estimation unit 58 estimates the turning angle of the turning wheels 24, has been carried out normally.

Here, in the following description, the case for which it is determined that the process in which the turning angle estimation unit 58 estimates the turning angle of the turning wheels 24 has been carried out normally will be described. That is, in the following description, the case in which the process proceeds from Step S114 to Step S116 described above will be described. The traveling mode of the vehicle is set to "Tmp-EPS" from time t7, where the process of reading out the turning angle information stored in the turning angle storage unit 48 has not been carried out normally and the process of estimating the turning angle of the turning wheels 24 by the turning angle estimation unit 58 has been carried out normally. As a result, a Tmp-EPS control is started from time t7 ("Tmp-EPS control in progress" shown in the drawing).

When the Tmp-EPS control is started and the time during which the straight traveling state of the vehicle is maintained is equal to or greater than the straight traveling determination time threshold value, the estimated turning angle following a determination of straight traveling (correct turning angle) is estimated (refer to steps S118-S124). Then, when the time during which the state in which the vehicle is stopped in a non-steering state is continued is equal to or greater than the non-steering stop determination time threshold value, the turning motor rotation angle with respect to the steering angle stored in the turning angle storage unit 48 is updated using the estimated turning angle following a determination of straight traveling (refer to steps S126-S132).

In addition, at time t7, a process is started to set the information signal that is to be transmitted to the driving support function control unit 64 to an information signal that continuously changes from the estimated pre-engagement turning angle to the estimated turning angle following a determination of straight traveling during the clutch state transition period (refer to Step S132). When the turning motor rotation angle with respect to the steering angle stored in the turning angle storage unit 48 is updated using the estimated turning angle following a determination of straight traveling, the traveling mode of the vehicle is set to "2M-SBW" at this time t8. Then, a process to switch the clutch 8 from the engaged state to the disengaged state is carried out, and the SBW control is started using the turning motor rotation angle with respect to the steering angle stored in the turning angle storage unit 48 that has been updated using the estimated turning angle following a determination of straight traveling ("SBW control in progress" shown in the drawing). Specifically, the above-described target turning angle is calculated using the turning motor rotation angle with respect to the steering angle stored in the turning angle storage unit 48 that has been updated using the estimated turning angle following a determination of straight traveling by the first turning motor control unit 50 and the second turning motor control unit 52.

That is, when the clutch 8 is switched to the disengaged state, the first turning motor control unit 50 and the second turning motor control unit 52 calculate the target turning angle using the estimated turning angle following a determination of straight traveling, which is the turning angle estimated by the turning angle estimation unit 58 after the determination of the vehicle straight traveling state has been made. Furthermore, at time t8, the information signal to be transmitted to the driving support function control unit 64, which started a continuous change from the estimated pre-engagement turning angle to the estimated turning angle following a determination of straight traveling at time t7, becomes an information signal that includes the estimated turning angle following a determination of straight traveling (refer to Step S132).

That is, the turning angle estimation unit 58 estimates the estimated pre-engagement turning angle and the estimated turning angle following a determination of straight traveling once the voltage, which is below the voltage threshold, becomes equal to or greater than the voltage threshold. In addition, when the clutch 8 is switched from the disengaged state to the engaged state, the driving support function control unit 64 controls the driving support function using the estimated pre-engagement turning angle. In addition, when the clutch 8 is switched from the engaged state to the disengaged state, the driving support function is controlled using the continuous change turning angle during the clutch state transition period.

As described above, in the steer-by-wire system 1 according to the first embodiment, an information signal that includes the continuous change turning angle is transmitted to the driving support function control unit 64 from the point in time at which the process to switch the clutch 8, which is in the engaged state, to the disengaged state is started, until time t8, when the SBW control is started. That is, the turning angle that is included in the information signal to be transmitted to the driving support function control unit 64 is continuously changed, from the estimated pre-engagement turning angle to the estimated turning angle following a determination of straight traveling, between time t7 and time t8 (refer to FIG. 7).

Thus, it becomes possible to carry out control of the driving support function using the continuous change turning angle, which continuously changes, from the point in time at which the process to switch the clutch 8, which is in the engaged state, to the disengaged state is started, until the point in time at which the clutch 8, which is in the engaged state, is switched to the disengaged state. Therefore, even if the turning angle stored in the turning angle storage unit 48 cannot be read out, it becomes possible to carry out an SBW control or a control of the driving support function using a turning angle that is estimated in a state in which the estimation accuracy is high, from the point in time at which the clutch 8, which is in the engaged state, is switched to the disengaged state.

In addition, it becomes possible to suppress sudden changes in the control of the steering state, the braking force, the driving force, etc., of the vehicle and to carry out smooth control of the driving support function during the clutch state transition period. As described above, in the vehicle steering control method executed by the operation of the steer-by-wire system 1 according to the first embodiment, the clutch 8 is switched from the disengaged state to the engaged state when the ignition switch 130 is in the on state and the voltage of the battery 46 goes below a voltage threshold. In addition, the driving support function is controlled using the estimated pre-engagement turning angle. Moreover, the driving support function is controlled using the continuous change turning angle during the clutch state transition period. In addition, when the clutch 8, which is in the engaged state, is switched to the disengaged state, the driving support function is controlled using the estimated turning angle following a determination of straight traveling, which is the turning angle estimated after a determination of the vehicle straight traveling state has been made.

As described above, the turning angle information stored in the turning angle storage unit 48 is invalidated in Step S111. This is because, after SBW control is started after the rotation angle stored in the turning angle storage unit 48 is read out, the turning angle is detected based on the steering angle, which is the absolute angle detected by the steering angle sensor 10, and on the motor rotation angle, which is the relative angle detected by the first turning motor angle sensor 16 or the second turning motor angle sensor 18. In other words, this is to avoid erroneously reading out the turning angle information during SBW control, since the stored turning angle information after SBW control is started is meaningless.

In steps S100 to S108, if the turning angle information stored in the turning angle storage unit 48 is read out normally, and the process of estimating the turning angle of the turning wheels 24 is carried out normally by the turning angle estimation unit 58, the process proceeds to an SBW control in Step S110, and an invalidation process to invalidate the turning angle information stored in the turning angle storage unit 48 is executed in Step S111.

Since the voltage of the battery 46 becomes stable if an engine start is completed and the alternator 103 has started power generation, the steer-by-wire controller 22 can be stably operated. However, even after the start of the SBW control accompanying an operation of the starter motor 102 at the time of an engine start, there are cases in which the voltage of the battery 46 decreases and the power supply voltage that is supplied to the steer-by-wire controller 22 decreases. That is, since the supply of power to the steer-by-wire controller 22 is started as the ignition switch 130 is placed in the on state, there are cases in which an SBW control is started in the steer-by-wire controller 22 before the voltage of the battery 46 has stabilized, and the turning angle information in the turning angle storage unit 48 is invalidated.

At this time, if the steer-by-wire controller 22 were to be restarted due to a reduction in the voltage of the battery 46, the steer-by-wire controller 22 would be restarted in a state in which the turning angle information in the turning, angle storage unit 48 is invalidated, and the turning angle information cannot be read out normally from the turning angle storage unit 48. Therefore, it would be necessary for the turning angle storage unit 48 to carry out the turning angle estimation shown in steps S106 to S132, even if the correct turning angle information were stored, so that there is the problem that an SBW control cannot be quickly started. Specifically, whereas the steering angle sensor 10 can detect an absolute angle, the first turning motor angle sensor 16 and the second turning motor angle sensor 18 can only detect relative angles from the time of activation; therefore, if there is no turning angle information that represents the relative angle between the steering angle and the turning angle in the turning angle storage unit 48, the turning angle cannot be detected and the SBW control cannot be started.

Therefore, in the first embodiment, the turning angle information in the turning angle storage unit 48 is invalidated after it is determined that the voltage of the battery 46 has been stabilized in an invalidation process. In other words, invalidation of the turning angle information in the turning angle storage unit 48 is prohibited until the voltage of the battery 46 is determined to have stabilized. Details of the invalidation process according to the first embodiment will be described below using FIGS. 9-14.

Figure 9:
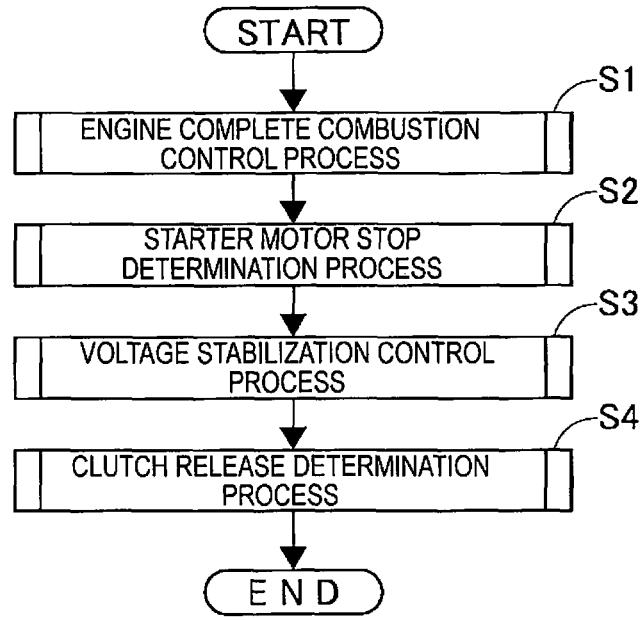
FIG. 9 is a flowchart illustrating an invalidation process according to the first embodiment.

FIG. 9 is a flowchart illustrating an invalidation process according to the first embodiment. Details of the determination process in each step will be described in detail in the flowcharts illustrated in FIGS. 10 to 13.

In Step S1, an engine complete combustion determination process is executed to determine whether or not the engine 101 is operating stably.

In Step S2, a starter motor stop determination process is executed to determine whether or not the operation of the starter motor 102 has stopped.

In Step S3, a voltage stability determination process is executed to determine whether or not the voltage of the battery 46 has stabilized, due to the stable operation of the engine 101, the stopping of the operation of the starter motor 102, and operation of the alternator 103.

In Step S4, a clutch release determination process is executed to determine the disengagement or the engagement of the clutch 8. Disengagement of the clutch 8 is executed at the same time as the start of SBW control, and when the clutch 8 is determined to be disengaged, the start of the SBW control and the invalidation of the turning angle information in the turning angle storage unit 48 are executed at the same time.

Figure 10:
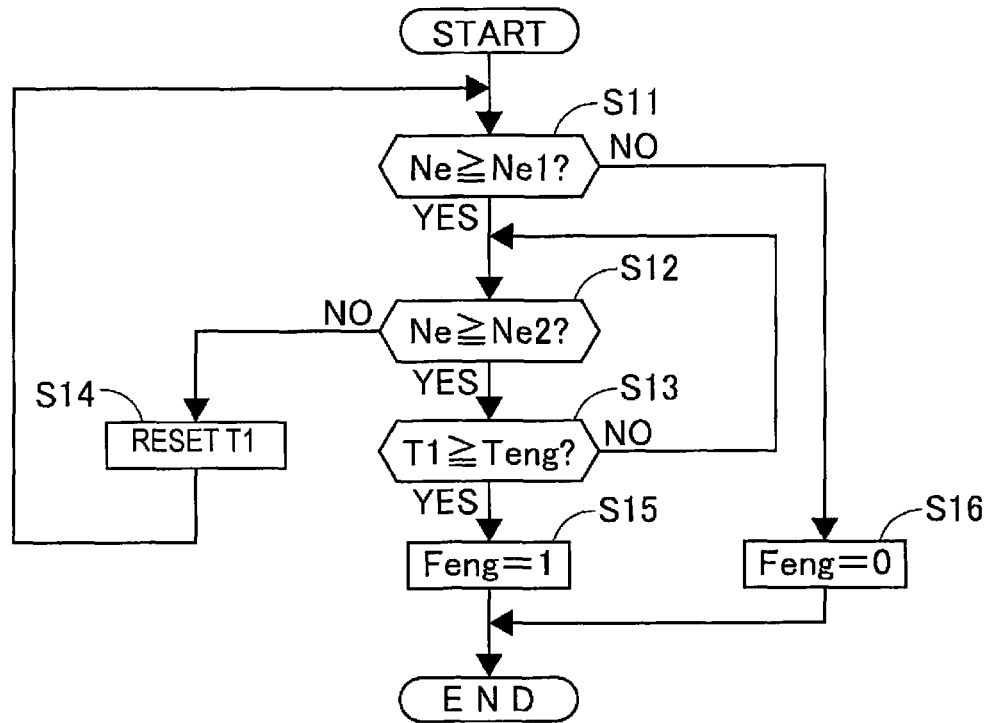
FIG. 10 is a flowchart illustrating an engine complete combustion determination process according to the first embodiment.

FIG. 10 is a flowchart illustrating an engine complete combustion determination process according to the first embodiment.

In Step S11, it is determined whether or not the engine rotation speed (hereinafter referred to as Ne) detected by the engine rotation speed sensor 110 is equal to or greater than an engine rotation speed threshold value required for the determination of complete combustion (hereinafter referred to as Ne1. For example, Ne1≥Ne2, where Ne2 is 500 rpm); if Ne is equal to or greater than Ne1, the process proceeds to Step S12; otherwise, the process proceeds to Step S16.

In Step S12, it is determined whether or not Ne is equal to or greater than an idling rotational speed (hereinafter referred to as Ne2.), which indicates that the engine 101 is autonomously rotating stably; if Ne is equal to or greater than Ne2, a first timer starts to count up and the process proceeds to Step S13; otherwise, the process proceeds to Step S14, the count value of the first timer (hereinafter referred to as T1.) is reset, and the process returns to Step S11. In the first embodiment, Ne2 is set to be a smaller value than Ne1; however, Ne1 and Ne2 may be set to the same rotational speed.

In Step S13, it is determined whether or not T1 is equal to or greater than a predetermined period (hereinafter referred to as Teng.) indicating stable operation of the engine 101; if T1 is equal to or greater than Teng, the process proceeds to Step S15; otherwise, the process returns to Step S12, and the counting up of the first timer is continued.

In Step S15, an engine complete combustion flag (hereinafter referred to as Feng.) is set to 1. On the other hand, if the condition of Step S13 is not satisfied, Feng is set to 0 in Step S16.

Figure 11:
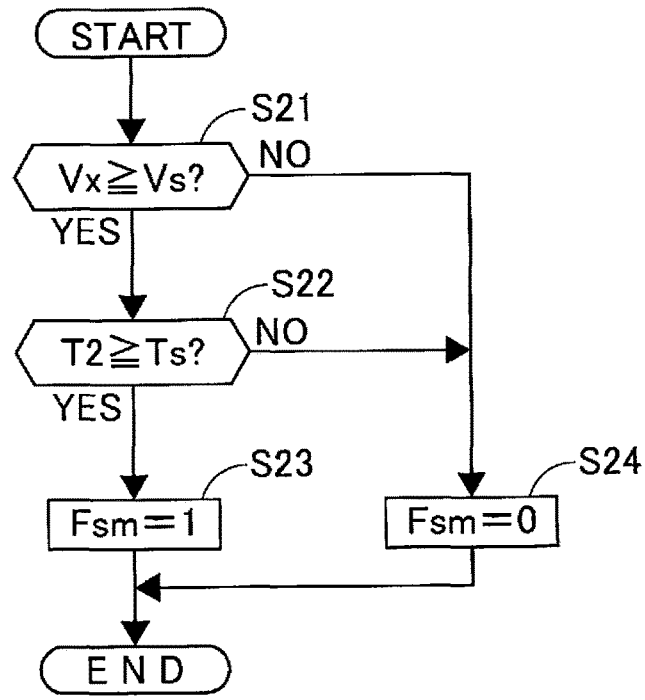
FIG. 11 is a flowchart illustrating a starter motor stop determination process according to the first embodiment.

FIG. 11 is a flowchart illustrating a starter motor stop determination process according to the first embodiment.

In Step S21, it is determined whether or not the voltage of the battery 46 (hereinafter referred to as Vx.) is equal to or greater than a predetermined voltage (hereinafter referred to as Vs.), which indicates that the operation of the starter motor 102 is stopped and the alternator 103 is operating; if Vx is equal to or greater than Vs, a second timer starts to count up and the process proceeds to Step S22; otherwise, the process proceeds to Step S24. That is, since the alternator 103 can generate power regardless of the voltage of the battery 46, it is difficult to determine the operating state of the alternator 103 from the voltage of the battery 46. On the other hand, if the starter motor 102 is in operation, the voltage of the battery 46 will necessarily be less than Vs. Then, the engine 101 is started by operating the starter motor 102, the operation of the starter motor 102 is stopped, and power generation by the alternator 103 is thus started; therefore, the voltage of the battery 46 necessarily becomes equal to or greater than Vs. That is, when Vx is equal to or greater than Vs, the starter motor 102 is reliably stopped, and a stable voltage can be secured.

In Step S22, it is determined whether or not the count value of the second timer (hereinafter referred to as T2) is equal to or greater than a predetermined period (hereinafter referred to as Ts), which indicates that the operation of the starter motor 102 is reliably stopped; if T2 is equal to or greater than Ts, the process proceeds to Step S23; otherwise, the process proceeds to Step S24.

In Step S23, a starter motor stop flag (hereinafter referred to as Fsm.) is set to 1. On the other hand, if the condition of Step S22 is not satisfied, Fsm is set to 0 in Step S24.

Figure 12:
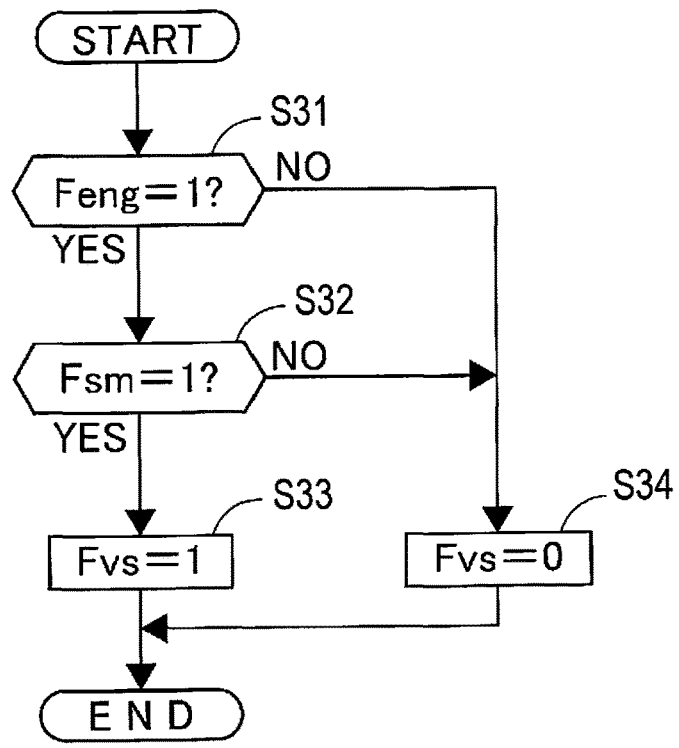
FIG. 12 is a flowchart illustrating a voltage stability determination process according to the first embodiment.

FIG. 12 is a flowchart illustrating a voltage stability determination process according to the first embodiment.

In Step S31, it is determined whether or not Feng is 1; if 1, the process proceeds to Step S32; if 0, the process proceeds to Step S34.

In Step S32, it is determined whether or not Fsm is 1; if 1, the process proceeds to Step S33; if 0, the process proceeds to Step S34.

In Step S33, a voltage stability flag (hereinafter referred to as Fvs) is set to 1. On the other hand, if the conditions of Step S31 and Step S32 are not satisfied, the process proceeds to Step S34 and Fvs is set to 0.

Figure 13:
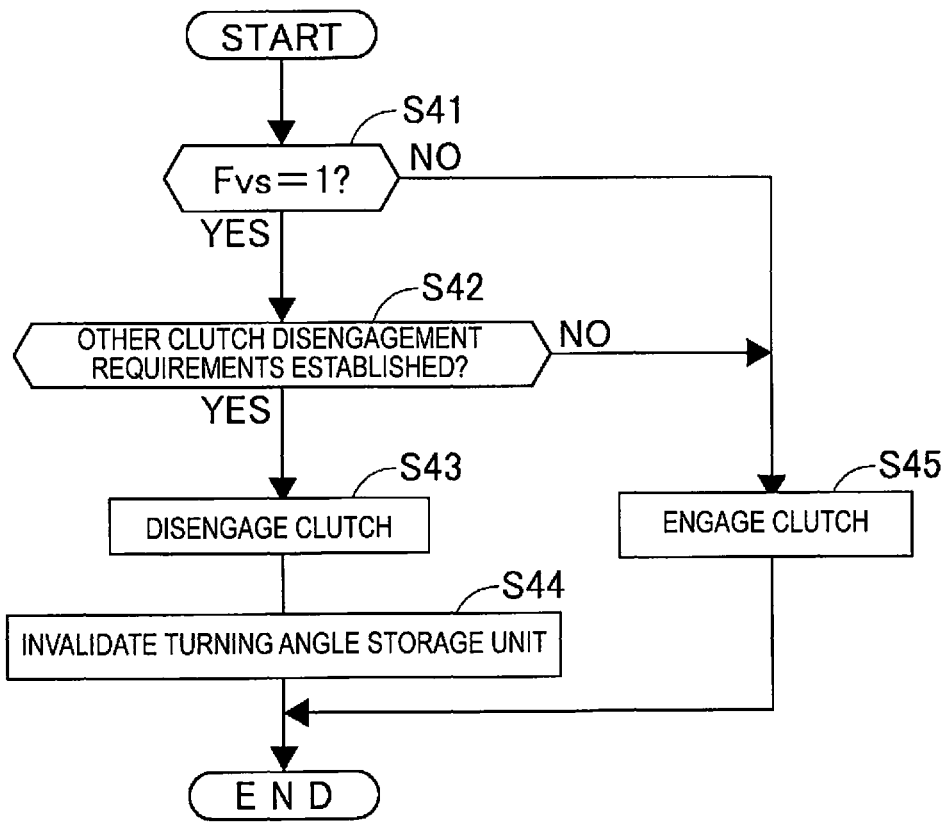
FIG. 13 is a flowchart illustrating a clutch release determination process according to the first embodiment.

FIG. 13 is a flowchart illustrating a clutch release determination process according to the first embodiment.

In Step S41, it is determined whether or not Fvs is 1; if 1, the process proceeds to Step S42; if 0, the process proceeds to Step S45.

In Step S42, it is determined whether or not other clutch disengagement requirements are satisfied; if such requirements are satisfied, the process proceeds to Step S43; otherwise, the process proceeds to Step S45. Here, the other clutch disengagement requirements mean, for example, that a transition condition from a traveling mode other than SBW control to the SBW control is satisfied, that there are no abnormalities associated with the sensors, etc. Other requirements may be appropriately added, with no limitations thereby imposed.

In Step S43, a disengagement command for the clutch 8 is output. On the other hand, if the conditions of steps S41 and S42 are not satisfied, an engagement command for the clutch 8 is output in Step S45, and a transition to the SBW control is prohibited.

In Step S44, the turning angle information stored in the turning angle storage unit 48 is invalidated. The disengagement command for the clutch 8 in Step S43 and the invalidation of the stored turning angle information in Step S44 may be switched, so that the invalidation is carried out first, or steps S43 and S44 may be carried out at the same time.

Figure 14:
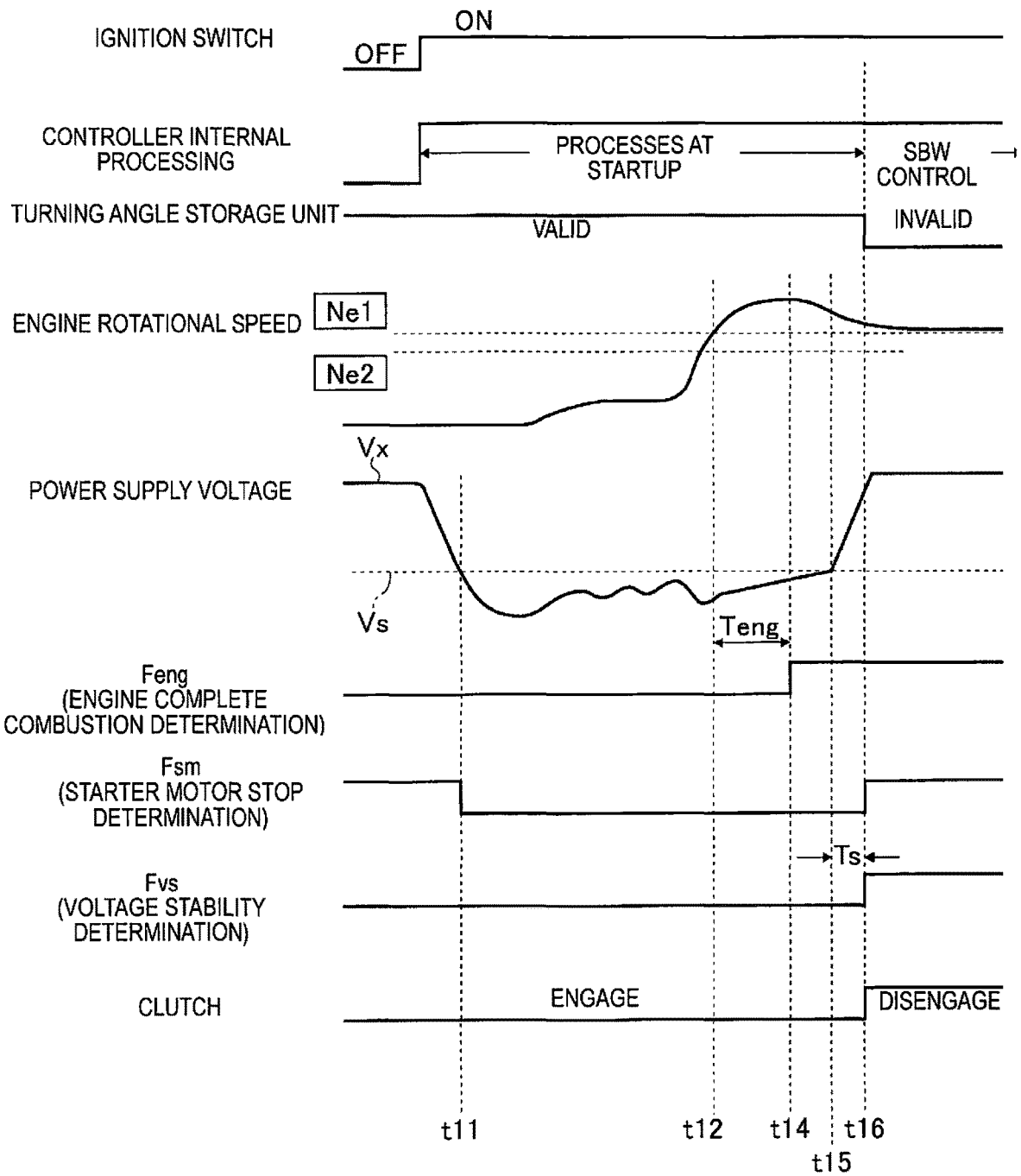
FIG. 14 is a timing chart illustrating the invalidation process according to the first embodiment.

FIG. 14 is a timing chart illustrating the invalidation process according to the first embodiment. The timing chart shown in FIG. 14 illustrates the situation in which, while the vehicle is stopped, the ignition switch 130 is switched from the off state to the on state, the torque transmission path is mechanically separated, and the traveling mode of the vehicle is set to "2M-SBW" ("SBW control in progress" shown in the drawing). When the driver switches the ignition switch 130 to the off state, such as after parking the vehicle, it is assumed that the processes to be carried out at the end of an SBW control have been carried out. Here, the processes to be carried out at the end of an SBW control include a process to switch the clutch 8 from the disengaged state to the engaged state ("clutch engagement" shown in the drawing), and a process to estimate the turning angle of the turning wheels 24. The process to be carried out at the end of an SBW control also includes writing and storing the turning angle of the turning wheels' 24 at the time of estimation in the turning angle storage unit 48.

When the driver switches the ignition switch 130 to the on state at time t11, the process to be carried out at the time of activation of an SBW control is carried out. Specifically, the process to be carried out is the reading out of the turning angle of the turning wheels 24, which is written and stored in the turning angle storage unit 48 in the process to be carried out at the end of an SBW control. On the other hand, in the engine controller 120, since engine cranking is started by an operation of the starter motor 102, Vx starts to decrease.

When the engine rotation speed Ne exceeds Ne1 at time t12, since the engine rotation speed Ne exceeds Ne2, the first timer starts to count up.

When the count value T1 of the first timer becomes equal to or greater than Teng at time t14, it is determined that the engine 101 is in a state of complete combustion, and the engine complete combustion flag Feng is set to 1. At this point in time, since it cannot be said that the operation of the starter motor 102 has stopped, and power generation by the alternator 103 has not started, Vx is less than Vs.

When Vx exceeds Vs at time t15, the second timer starts to count up. Then, when the count value T2 of the second timer becomes equal to or greater than Ts at time t16, it is determined that the operation of the starter motor 102 has stopped, and the starter motor stop flag Fsm is set to 1. Similarly, since Feng and Fsm are set to 1, the voltage stability flag Fvs is set to 1, the turning angle information stored in the turning angle storage unit 48 is invalidated, and the clutch 8 is disengaged.

That is, the turning angle information stored in the turning angle storage unit 48 is invalidated only when the voltage stabilizes, complete combustion in the engine 101 occurs, the starter motor 102 has stopped, and power generation by the alternator 103 has started; therefore, even if the voltage of the battery 46 is greatly reduced between time t11 and time t14 and the steer-by-wire controller 22 carries out a reset, the turning angle information stored in the turning angle storage unit 48 remains valid, and thus it is possible to quickly initiate SBW control.

The following effects can be exerted in the first embodiment.

(1) A control method for a steer-by-wire system 1 for a vehicle that is equipped with an engine 101 and a battery 46, and that is provided with a torque transmission path that can connect or separate the steering wheel 38 and turning wheels 24, comprising a step to detect the steering angle of the steering wheel 38, a step to detect the turning angle of the turning wheels 24, and a step to control the turning angle of the turning wheels based on the steering angle and the turning angle in a state in which the torque transmission path between the steering wheel 38 and the turning wheels 24 is mechanically separated, wherein, when the ignition switch 130 is ON, and the battery voltage Vx is detected to be equal to or greater than a predetermined voltage Vs (predetermined value), and that the engine rotation speed Ne during a predetermined period Teng after the engine rotation speed Ne becomes equal to or greater than a threshold value required for the determination of complete combustion Ne1 (first predetermined value) is equal to or greater than an idling rotational speed Ne2 (second predetermined value), which is equal to or less than the complete combustion determination threshold Ne1, invalidation of information relating to steering that is stored in a turning angle storage unit 48 (memory of the steer-by-wire system) is permitted.

That is, since invalidation is carried out only when the voltage of the battery 46 becomes stable, the turning angle storage unit 48 is able to operate the steer-by-wire system 1 in a state in which the voltage of the battery 46 is stable, and it becomes possible to provide a steer-by-wire system 1 that can be operated stably.

(2) A control method for a steer-by-wire system 1 for a vehicle that is equipped with an engine 101 and a battery 46, and that is provided with a torque transmission path that can connect or separate the steering wheel 38 and turning wheels 24, comprising a step to detect the steering angle of the steering wheel 38, a step to detect the turning angle of the turning wheels 24, and a step to control the turning angle of the turning wheels based on the steering angle and the turning angle in a state in which the torque transmission path between the steering wheel 38 and the turning wheels 24 is mechanically separated, wherein, when the ignition switch 130 is ON, invalidation of information relating to steering that is stored in a turning angle storage unit 48 is prohibited until it is detected that the battery voltage Vx is equal to or greater than a predetermined voltage Vs (predetermined value), and that the engine rotation speed Ne during a predetermined period Teng after the engine rotation speed Ne becomes equal to or greater than a threshold value required for the determination of complete combustion Ne1 (first predetermined value) is equal to or greater than an idling rotational speed Ne2 (second predetermined value), which is equal to or less than the complete combustion determination threshold Ne1.

That is, since invalidation is prohibited until the voltage of the battery 46 becomes stable, the turning angle storage unit 48 is able to operate the steer-by-wire system 1 in a state in which the voltage of the battery 46 is stable, and it becomes possible to provide a steer-by-wire system 1 that can be stably operated.

(3) The step to detect the steering angle of the steering wheel 38 is a step to detect with a steering angle sensor 10 the current steering angle, the step to detect the turning angle of the turning wheels 24 is a step to detect the deviation angle between the steering angle at the time of starting detection and a position of the turning wheels 24, and the rotation angle from the position of the turning wheels 24 at the time of starting detection and the current position of the turning wheels 24, and to detect the turning angle of the turning wheels 24 based on the detected steering angle, the deviation angle, and the detected rotation angle, and the information relating to steering that is stored in the turning angle storage unit 48 is the deviation angle.

After the SBW control is started after the reading out of the rotation angle stored in the turning angle storage unit 48, the turning angle is detected based on the steering angle, which is the absolute angle detected by the steering angle sensor 10, and on the motor rotation angle, which is the relative angle detected by the first turning motor angle sensor 16 or the second turning motor angle sensor 18. That is, the stored turning angle information is meaningless after the SBW control is started. Therefore, it is possible to avoid erroneously reading out the turning angle information during an SBW control by invalidating the deviation angle after the SBW control is started. In addition, even if the voltage of the battery 46 decreases and the steer-by-wire controller 22 is restarted due to a decrease in the power supply voltage that is supplied to the steer-by-wire controller 22 accompanying an operation of the starter motor 102 at the time of an engine start, it is possible to avoid restarting the steer-by-wire controller 22 in a state in which the turning angle information in the turning angle storage unit 48 is invalidated, and to quickly start the SBW control using the correct turning angle information stored in the turning angle storage unit 48.

(4) A clutch 8 is provided in a torque transmission path between the steering wheel 38 and the turning wheels 24, and the steer-by-wire system 1 disengages the clutch 8 and invalidates the information relating to steering that is stored in the turning angle storage unit 48.

Therefore, after the SBW control is started, it is possible to avoid erroneously reading out the turning angle information during an SBW control by starting the SBW control and invalidating the turning angle storage unit 48 as the clutch 8 is disengaged.

(5) When the ignition switch 130 is switched from ON to OFF, the deviation angle is written to the invalidated turning angle storage unit 48 to validate the information in the turning angle storage unit 48.

Therefore, when the ignition switch 130 is placed in the on state again, it becomes possible to read information relating to steering, and to quickly activate the SBW control.

(6) A steer-by-wire system 1 for a vehicle that is equipped with an engine 101 and a battery 46, and that is provided with a torque transmission path that can connect or separate the steering wheel 38 and turning wheels 24, comprising a steering angle sensor 10 that detects the steering angle of the steering wheel 38, a turning angle estimation unit 58 (turning angle sensor) that detects the turning angle of the turning wheels 24, and a steer-by-wire controller 22 that controls the turning angle of the turning wheels 24 based on the steering angle and the turning angle in a state in which the torque transmission path between the steering wheel 38 and the turning wheels 24 is mechanically separated, wherein, when the ignition switch 130 is ON, and it is detected that the battery voltage Vx is equal to or greater than a predetermined voltage Vs (predetermined value), and that the engine rotation speed Ne during a predetermined period Teng after the engine rotation speed Ne becomes equal to or greater than a threshold value required for the determination of complete combustion Ne1 (first predetermined value) is equal to or greater than an idling rotational speed Ne2 (second predetermined value), which is equal to or less than the complete combustion determination threshold Ne1, the steer-by-wire controller 22 invalidates information relating to steering that is stored in a turning angle storage unit 48 (memory of the steer-by-wire system).

That is, since invalidation is carried out only when the voltage of the battery 46 becomes stable, the turning angle storage unit 48 is able to operate the steer-by-wire system 1 in a state in which the voltage of the battery 46 is stable, and it becomes possible to provide a steer-by-wire system 1 that can be stably operated.

The invention claimed is:

1. A steer-by-wire control method for a steer-by-wire system that is mounted in a vehicle equipped with an engine and a battery, and that is provided with a torque transmission path that can connect or separate a steering wheel and turning wheels, the control method comprising:
   a step to detect a steering angle of the steering wheel;
   a step to detect a turning angle of the turning wheels; and
   a steer-by-wire control step to control the turning angle of the turning wheels based on the steering angle and the turning angle in a state in which the torque transmission path between the steering wheel and the turning wheels is mechanically separated;
   storing a deviation angle between the steering angle and the turning angle in a non-volatile memory of the steer-by-wire system as a readable value when an ignition switch is switched from ON to OFF;
   reading the deviation angle from the non-volatile memory when the ignition switch is switched from OFF to ON; and
   prohibiting further reading of the deviation angle from the non-volatile memory after reading the deviation angle from the non-volatile memory and after reading the deviation angle from the non-volatile memory and after starting the steer-by-wire control.

2. A steer-by-wire control method for a steer-by-wire system that is mounted in a vehicle that is equipped with an engine and a battery, and that is provided with a torque transmission path that can connect or separate a steering wheel and turning wheels, the control method comprising:
   a step to detect a steering angle of the steering wheel;
   a step to detect a turning angle of the turning wheels; and
   a steer-by-wire control step to control the turning angle of the turning wheels based on the steering angle and the turning angle in a state in which the torque transmission path between the steering wheel and the turning wheels is mechanically separated,
   storing a deviation angle between the steering angle and the turning angle in a non-volatile memory of the steer-by-wire system as a readable value when an ignition switch is switched from ON to OFF;
   reading the deviation angle from the non-volatile memory when the ignition switch is switched from OFF to ON; and
   permitting reading of the deviation angle stored in the non-volatile memory when the ignition switch is ON until a battery voltage is detected to be equal to or greater than a predetermined value, and an engine rotation speed during a predetermined period after the engine rotation speed becomes equal to or greater than a first predetermined value is equal to or greater than a second predetermined value, which is equal to or less than the first predetermined value.

3. The steer-by-wire control method as recited in claim 1, wherein the step to detect the steering angle of the steering wheel is a step to detect with a steering angle sensor the current steering angle, and the step to detect the turning angle of the turning wheels is a step to detect a deviation angle between the steering angle at a time of starting detection and a position of the turning wheels, and a rotation angle from the position of the turning wheels at the time of starting detection and the current position of the turning wheels, and to detect the turning angle of the turning wheels based on the detected steering angle, the initial deviation angle, and the detected rotation angle.

4. The steer-by-wire control method as recited in claim 1, wherein a clutch is provided in a torque transmission path between the steering wheel and the turning wheels, and further comprising disengaging the clutch and prohibiting reading deviation angle from the non-volatile memory.

5. A steer-by-wire system for a vehicle that is equipped with an engine and a battery, and that is provided with a torque transmission path that can connect or separate a steering wheel and turning wheels, the steer-by-wire system comprising:

a steering angle sensor that detects a steering angle of the steering wheel;

a turning angle sensor that detects a turning angle of the turning wheels; and a steer-by-wire controller that controls the turning angle of the turning wheels based on the steering angle and the turning angle in a state in which the torque transmission path between the steering wheel and the turning wheels is mechanically separated, the steer-by-wire controller being configured to store a deviation angle between the steering angle and the turning angle in a non-volatile memory of the steer-by-wire system as a readable value when an ignition switch is switched from ON to OFF;

the steer-by-wire controller being configured to read the deviation angle from the non-volatile memory when the ignition switch is switched from OFF to ON; and the steer-by-wire controller being configured to prohibit further reading of the deviation angle from the non-volatile memory after reading the deviation angle from the non-volatile memory and after reading the deviation angle from the non-volatile memory and after starting the steer-by-wire control.

6. The steer-by-wire control method as recited in claim 2, wherein the step to detect the steering angle of the steering wheel is a step to detect with a steering angle sensor the current steering angle, and the step to detect the turning angle of the turning wheels is a step to detect a deviation angle between the steering angle at a time of starting detection and a position of the turning wheels, and a rotation angle from the position of the turning wheels at the time of starting detection and the current position of the turning wheels, and to detect the turning angle of the turning wheels based on the detected steering angle, the initial deviation angle, and the detected rotation angle.

7. The steer-by-wire control method as recited in claim 2, wherein a clutch is provided in a torque transmission path between the steering wheel and the turning wheels, and further comprising disengaging the clutch and prohibiting reading deviation angle from the non-volatile memory.

* * * * *